(12) United States Patent
Watanabe

(10) Patent No.: US 9,081,176 B2
(45) Date of Patent: Jul. 14, 2015

(54) OBSERVATION SYSTEM AND OBSERVATION METHOD

(75) Inventor: Tomonobu Watanabe, Osaka (JP)

(73) Assignee: OSAKA UNIVERSITY, Suita-Shi, Osaka (JP)

( * ) Notice: Subject to any disclaimer, the term of this patent is extended or adjusted under 35 U.S.C. 154(b) by 255 days.

(21) Appl. No.: 13/639,200

(22) PCT Filed: Feb. 7, 2011

(86) PCT No.: PCT/JP2011/052543
§ 371 (c)(1),
(2), (4) Date: Oct. 4, 2012

(87) PCT Pub. No.: WO2011/125370
PCT Pub. Date: Oct. 13, 2011

(65) Prior Publication Data
US 2013/0026347 A1    Jan. 31, 2013

(30) Foreign Application Priority Data
Apr. 5, 2010 (JP) ................. 2010-086945

(51) Int. Cl.
*H01L 27/146* (2006.01)
*G02B 21/00* (2006.01)
*G02B 21/36* (2006.01)

(52) U.S. Cl.
CPC ............ *G02B 21/008* (2013.01); *G02B 21/365* (2013.01)

(58) Field of Classification Search
CPC ........................... G02B 21/008; G02B 21/365
USPC ........ 250/208.1, 216; 359/291, 368, 385, 568
See application file for complete search history.

(56) References Cited

U.S. PATENT DOCUMENTS

| 4,561,731 A | 12/1985 | Kley |
| 5,587,832 A | 12/1996 | Krause |
| 5,686,960 A * | 11/1997 | Sussman et al. ........... 348/218.1 |
| 2002/0154398 A1 | 10/2002 | Wolleschensky et al. |

FOREIGN PATENT DOCUMENTS

| JP | S56-137324 | 10/1981 |
| JP | H11-101942 A | 4/1999 |
| JP | 3634343 | 1/2005 |

* cited by examiner

*Primary Examiner* — Tony Ko
(74) *Attorney, Agent, or Firm* — Roberts Mlotkowski Safran & Cole P.C.

(57) ABSTRACT

An observation system 100 for observing a to-be-observed specimen 1 on the basis of coming light 2 coming from the to-be-observed specimen 1 includes a conversion unit 104 configured to convert the coming light 2 to a first converted light ray with a first pupil function and to convert the coming light 2 to a second converted light ray with a second pupil function and an image information generation unit 106 configured to generate image information on the to-be-observed specimen 1 on the basis of the first converted light ray obtained by converting the coming light 2 with the first pupil function and the second converted light ray obtained by converting the coming light with the second pupil function. The second pupil function is preferably different from the first pupil function.

11 Claims, 29 Drawing Sheets

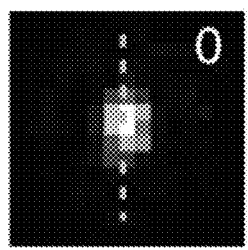 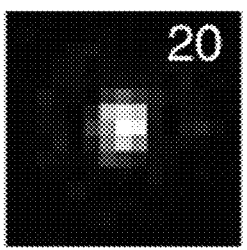 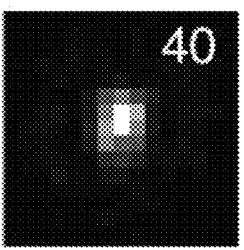 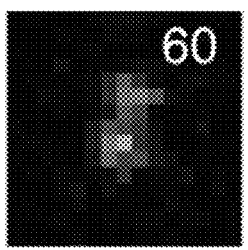
FIG. 28A     FIG. 28B     FIG. 28C     FIG. 28D
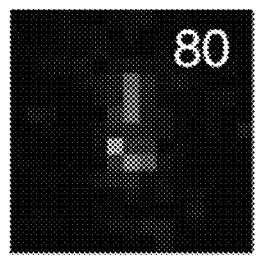 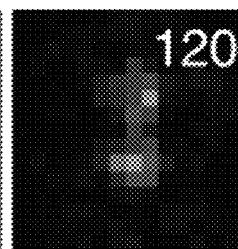 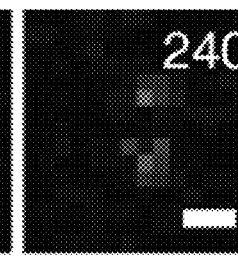
FIG. 28E     FIG. 28F     FIG. 28G

OBSERVATION SYSTEM AND OBSERVATION METHOD

CROSS-REFERENCE TO RELATED APPLICATIONS

The present Application is a U.S. National Phase of PCT/JP2011/052543, filed on Feb. 7, 2011 ("PCT Application"), which claims priority from Japanese Application No. 2010-086945, filed on Apr. 5, 2010. The PCT and Japanese Applications are hereby incorporated by reference in their entirety into the present Application. The PCT application, incorporated by reference herein, includes any amendments entered in the PCT application.

TECHNICAL FIELD

The present invention relates to observation systems and observation methods for observing a to-be-observed specimen on the basis of coming light coming from the to-be-observed specimen.

BACKGROUND ART

Observation of a to-be-observed specimen through an optical microscope is performed in such a manner that light is irradiated to the to-be-observed specimen, and coming light (reflected light, transmitted light, fluorescent light, etc.) from the to-be-observed specimen is imaged through a lens. Fluorescence microscopes using fluorescent light as the coming light are divided into a non-scanning type and a scanning type. In the non-scanning type fluorescence microscopes, only light (excitation light) having a specified wavelength is irradiated to a to-be-observed specimen to image the fluorescent light emitted from the to-be-observed specimen by a lens, thereby observing the to-be-observed specimen. The wavelength of the fluorescent light emitted from the to-be-observed specimen is different from the wavelength of the excitation light. Accordingly, it is possible to take out only the fluorescent light with a filter or the like to obtain a cross-section image. The scanning type fluorescence microscopes include confocal optical microscopes for obtaining a cross-section image. A confocal optical microscope performs laser scanning on a to-be-observed specimen along a cross-section plane to obtain a point light source coming from the to-be-observed specimen. Since a cross-section image composed of only images in focus is obtainable, an image with less blur can be generated to enable observation of the to-be-observed specimen (PTL 1 and PTL 2).

CITATION LIST

Patent Literature

[PTL 1] U.S. Pat. No. 5,587,832
[PTL 2] Japanese Patent No. 3634343

SUMMARY OF INVENTION

Technical Problem

However, a cross-section image obtained by the non-scanning fluorescence microscope is seen as if an image in focus is overlaid with an image out of focus. The reason is that the image is observed as an image of a single cross-section albeit the light path length to the focal position is different from the light path length to a non-focal position. Accordingly, when a thick to-be-observed specimen is observed, the resultant image showing the to-be-observed specimen includes multiple blurs. This means that it is impossible to obtain a clear image from which blurs are eliminated.

Referring to the scanning type fluorescence microscopes, laser scanning is performed on a to-be-observed specimen along a cross-section plane to obtain a point light source coming from the to-be-observed specimen. Therefore, in order to generate an image with less blur, timing of scanning and timing of obtaining a point light source must be synchronized with each other exactly. This requires an expensive and highly precise synchronization system for an observation system. Further, since the laser scanning is performed on a to-be-observed specimen along a cross-section plane, time required for obtaining a cross-section image of a to-be-observed specimen may serve as rate limiting for the scanning time.

The present invention has been made in view of the foregoing problems and has its object of providing an observation system and an observation method which can obtain a clear image from which blurs are eliminated from cross-section image information obtained by utilizing coming light coming from a to-be-observed specimen.

Solution to Problem

In order to overcome the above problems, an observation system according to the present invention is an observation system for observing a to-be-observed specimen on the basis of coming light coming from the to-be-observed specimen, which includes: a conversion unit configured to convert the coming light to a first converted light ray with a first pupil function and to convert the coming light to a second converted light ray with a second pupil function; and an image information generation unit configured to generate image information on the to-be-observed specimen on the basis of the first converted light ray and the second converted light ray.

As described in BACKGROUND ART, a cross-section image obtained by a conventional non-scanning type fluorescence microscope is seen as if an image in focus is overlaid with an image out of focus. Accordingly, when a thick to-be-observed specimen is observed, the resultant image of the to-be-observed specimen includes multiple blurs. Thus, no clear image from which blurs are eliminated can be obtained. Further, the conventional scanning type fluorescence microscope performs laser scanning on a to-be-observed specimen along a cross-section plane to obtain a point light source coming from the to-be-observed specimen. Therefore, in order to generate an image with less blur, timing of scanning and timing of obtaining a point light source must be synchronized with each other exactly. This requires an expensive and highly precise synchronization system for an observation system. Further, time required for obtaining a cross-section image of a to-be-observed specimen may serve as rate limiting for the scanning time.

By contrast, the observation system according to the present invention generates image information on the to-be-observed specimen on the basis of the first converted light ray obtained by the converting the coming light coming from the to-be-observed specimen with the first pupil function and the second converted light ray obtained by converting the coming light with the second pupil function. For example, converted light rays converted with different pupil functions have different intensity distributions. Overlaying the different intensity distributions or extracting difference between the different intensity distributions can make difference between the peak intensity and other intensity more distinct, thereby suppressing a spread of the intensity distribution of the coming light coming from the to-be-observed specimen. Thus, a clear image from which blurs are eliminated can be obtained from the cross-section image information obtained by utilizing the coming light coming from the to-be-observed specimen.

According to a preferred embodiment of the observation system of the present invention, a pupil function changing unit configured to change at least one of the first pupil function and the second pupil function is further provided. For example, even when a combination of the first pupil function and the second pupil function results in image information which includes multiple blurs and is not suitable for observation, appropriate change of at least one of the first pupil function and the second pupil function can obtain an image having desired resolution with less blur.

According to a preferred embodiment of the observation system of the present invention, the conversion unit includes a first conversion section configured to convert the coming light with the first pupil function and a second conversion section configured to convert the coming light with the second pupil function. That is, the conversion unit is composed of the first conversion section and the second conversion section, which are provided separately. Accordingly, the coming light can be simultaneously converted to the first converted light ray and the second converted light ray, thereby enabling speedy, reliable, and efficient generation of image information with less blur.

According to a preferred embodiment of the observation system of the present invention, the conversion unit includes a reflecting member or a transmitting member. The reflecting member and the transmitting member can be ready-made easily available at low cost. Accordingly, the coming light can be converted to the first converted light ray and the second converted light ray with a low-cost member without requiring any special member as the conversion unit.

According to a preferred embodiment of the observation system of the present invention, a focal position changing unit configured to change a focal position of the coming light is further provided. For example, change in focal position of the coming light can be realized by changing the light path length to the focal point of the coming light. This can change the spread of the intensity distribution of the coming light coming from the to-be-observed specimen. Accordingly, even when it is difficult to obtain sufficient resolution with only a combination of the first pupil function and the second pupil function, change in focal position of the coming light can result in formation an image having desired resolution with less blur.

According to a preferred embodiment of the observation system of the present invention, each of the first pupil function and the second pupil function is a function in two-dimensional donut shape with an inner ring and an outer ring, and the first conversion section and the second conversion section allow regions surrounded by the respective inner rings and the respective outer rings to function as non-shielded regions of the first pupil function and the second pupil function, respectively. In this case, the conversion unit can shield the coming light that reaches the regions outside the outer rings of the donut shapes to reduce influence of spherical aberration caused in the presence of the optical system of the observation system, thereby increasing optical axial resolution. Further, the conversion unit can shield the coming light that reaches the regions inside the inner rings of the donut shapes to eliminate influence of light with much noise which reaches the regions inside the inner rings of the donut shapes. Thus, a further clear image can be obtained.

According to a preferred embodiment of the observation system of the present invention, in each of the functions in two-dimensional donut shape, a value of a ratio between a diameter of the inner ring and a diameter of the outer ring is ⅙ to ⅘. When each value of the ratios between the diameters of the inner rings and the diameters of the outer rings falls in such the range, the spread of the intensity distribution of the coming light coming from the to-be-observed specimen can be suppressed reliably. Thus, a clear image from which blurs are eliminated can be generated from the cross-section image information obtained by utilizing the coming light coming from the to-be-observed specimen.

In order to solve the above problems, an observation method according to the present invention is a method for observing a to-be-observed specimen on the basis of coming light coming from the to-be-observed specimen, which includes: a converting step of converting the coming light to a first converted light ray with a first pupil function and converting the coming light to a second converted light ray with a second pupil function; and an image information generating step of generating image information on the to-be-observed specimen on the basis of the first converted light ray and the second converted light ray.

According to the observation method in the present invention, the same effect as those obtained in the aforementioned observation system of the present invention can be provided. That is, the observation method according to the present invention generates image information on the to-be-observed specimen on the basis of the first converted light ray obtained by converting the coming light coming from the to-be-observed specimen with the first pupil function and the second converted light ray obtained by converting the coming light with the second pupil function. For example, converted light rays converted with different pupil functions have different intensity distributions. Overlaying the different intensity distributions or extracting difference between the different intensity distributions can make difference between the peak intensity and other intensity more distinct, thereby suppressing a spread of the intensity distribution of the coming light coming from the to-be-observed specimen. Thus, a clear image from which blurs are eliminated can be obtained from the cross-section image information obtained by utilizing the coming light coming from the to-be-observed specimen.

According to a preferred embodiment of the observation method of the present invention, a pupil function changing step of changing at least one of the first pupil function and the second pupil function is further included. For example, even when a combination of the first pupil function and the second pupil function results in image information which includes multiple blurs and is not suitable for observation, appropriate change of at least one of the first pupil function and the second pupil function can obtain an image having desired resolution with less blur.

According to a preferred embodiment of the observation method of the present invention, the converting step includes: a first converting step of converting the coming light with the first pupil function; and a second converting step of converting the coming light with the second pupil function. That is, as the converting step, the first converting step and the second converting step are carried out separately. Accordingly, the coming light can be simultaneously converted to the first converted light ray and the second converted light ray, thereby enabling speedy, reliable, and efficient generation of image information with less blur.

According to a preferred embodiment of the observation method of the present invention, a focal position changing step of changing a focal position of the coming light through the converting step is further included. Change in focal position of the coming light can be realized by changing the light path length to the focal point of the coming light. This can change the spread of the intensity distribution of the coming light coming from the to-be-observed specimen. Accordingly, even when it is difficult to obtain sufficient resolution with only a combination of the first pupil function and the second pupil function, change in focal position of the coming light can result in formation an image having desired resolution with less blur.

Further, in order to solve the above problems, an observation system according to the present invention is an observation system for observing a to-be-observed specimen on the basis of coming light coming from the to-be-observed specimen, which includes: a conversion unit configured to convert the coming light to a converted light ray by modulating intensity of the coming light with at least one pupil function; and an image information generation unit configured to generate image information on the to-be-observed specimen on the basis of the converted light ray. The at least one pupil function includes a shielded region and a non-shielded region arranged around the shielded region.

Moreover, in order to solve the above problems, an observation method according to the present invention is an observation method for observing a to-be-observed specimen on the basis of coming light coming from the to-be-observed specimen, which includes: a converting step of converting the coming light to a converted light ray by modulating intensity of the coming light with at least one pupil function; and an image information generating step of generating image information on the to-be-observed specimen on the basis of the converted light ray. In the converting step, the at least one pupil function includes a shielded region and a non-shielded region arranged around the shielded region.

According to the observation system and the observation method of the present invention, the coming light that reaches the shielded region inside the non-shielded region is shielded. This can eliminate influence of light with much noise that reaches the shield region. Accordingly, a clear image from which blurs are eliminated can be generated from the cross-section image information obtained by utilizing the coming light coming from the to-be-observed specimen.

BRIEF DESCRIPTION OF DRAWINGS

FIG. 2 shows point spread distributions of a fluorescent bead observed with the observation system, which is set so that all pixels of a second conversion section absorb light, while all pixels of a first conversion section reflect light, wherein

FIG. 5 shows point spread distributions of a fluorescent bead observed with the observation system, which is set so that a first pupil function in donut shape with an outer ring having a diameter of 1040 µm and an inner ring having a diameter of 208 µm is provided to the first conversion section, while a second pupil function in donut shape with an outer ring having a diameter of 1040 µm and an inner ring having a diameter of 832 µm is provided to the second conversion section, wherein

FIG. 6 shows point spread distributions of a fluorescent bead observed with the observation system, from which the results shown in FIG. 5 are obtained, after the focal length of the coming light is changed by moving the second conversion section, wherein

FIG. 7 shows point spread distributions of a fluorescent bead observed with the observation system set so that a first pupil function in donut shape with an outer ring having a diameter of 1040 µm and an inner ring having a diameter of 832 µm is provided to the first conversion section, while a second pupil function in donut shape with an outer ring having a diameter of 624 µm and an inner ring having a diameter of 208 µm is provided to the second conversion section, wherein

FIG. 21 presents graphs showing fluorescence intensity distributions in a section taken along the dotted line in FIG. 20, wherein

FIGS. 28A-28G show images observed with the observation system 100 at respective different time points in Example 4.

DESCRIPTION OF EMBODIMENTS

With reference to the accompanying drawings, embodiments of an observation system and an observation method according to the present invention will be described below. It is noted that the present invention is not limited to the following embodiments.

Embodiment 1

Figure 1:
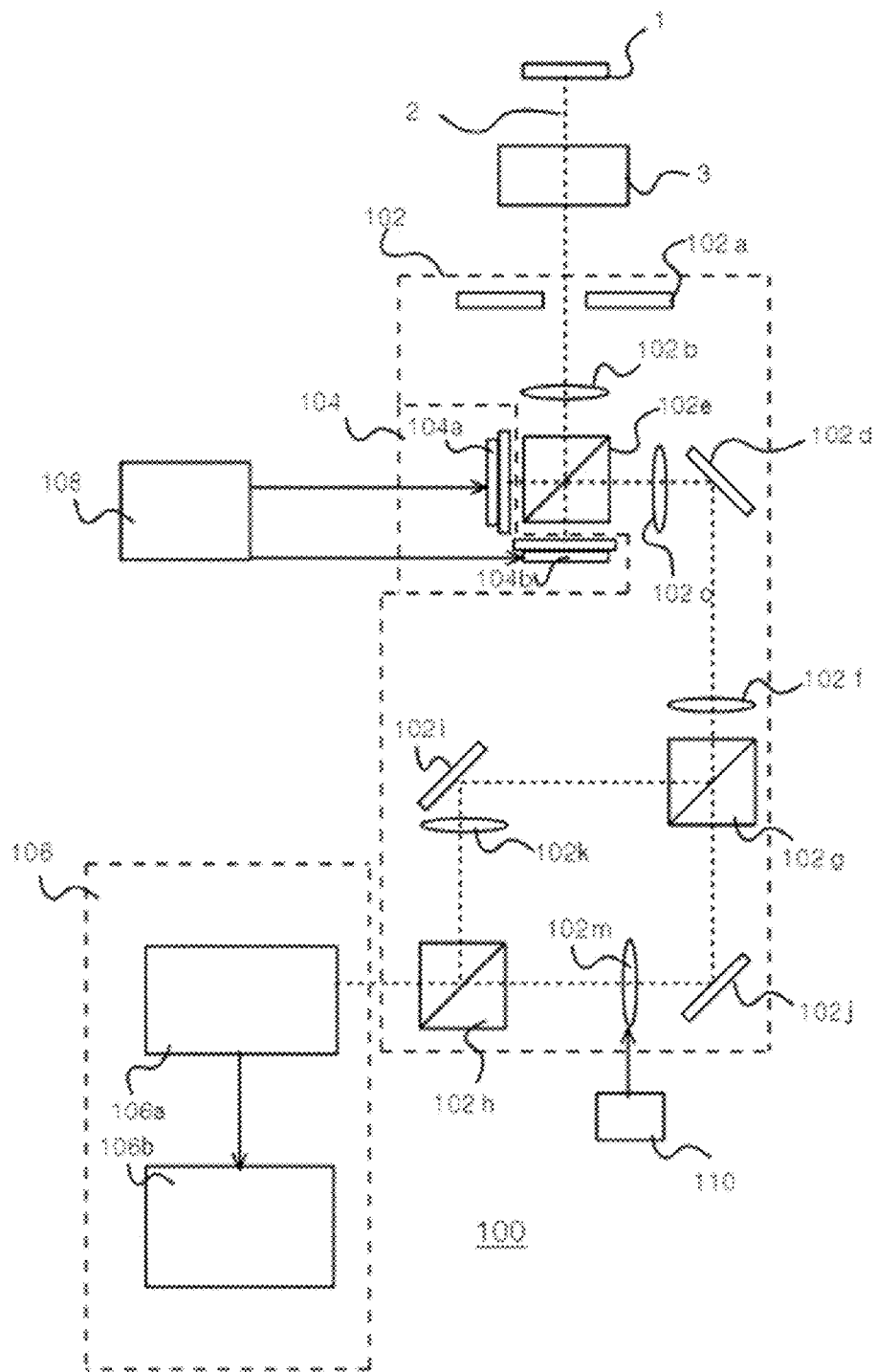
FIG. 1 is a schematic diagram showing an observation system according to Embodiment 1 of the present invention.

FIG. 1 is a schematic diagram showing an observation system 100 according to Embodiment 1 of the present invention. The observation system 100 observes a to-be-observed specimen 1 on the basis of coming light 2 coming from the to-be-observed specimen 1. The observation system 100 includes an optical system 102, a conversion unit 104 configured to convert the coming light 2 to a first converted light ray with a first pupil function and to convert the coming light to a second converted light ray with a second pupil function, an image information generation unit 106, a pupil function changing unit 108, and a focal position changing unit 110. It is noted that the pupil function changing unit 108 and the focal position changing unit 110 may be referred to as a function changing unit 108 and a position changing unit 110, respectively in the present specification.

The optical system 102 is provided after an imaging plane of a fluorescence microscope 3. The optical system 102 includes a slit 102a configured to limit the field of view arranged on the imaging plane, a first relay lens 102b, a second relay lens 102c, and a first mirror 102d, which are configured to relay an actual image on the imaging plane to the image information generation unit 106, a first polarizing beam splitter 102e configured to divide the coming light 2 into two rays according to polarization components, a third relay lens 102f, a fourth relay lens 102k, a fifth relay lens 102m, a second mirror 102i, and a third mirror 102j, which are configured to transmit the image transmitted through the first relay lens 102b and the second relay lens 102c to the image information generation unit 106, a second polarizing beam splitter 102g configured to divide the image transmitted through the first relay lens 102b and the second relay lens 102c into two according to polarization components, and a third polarizing beam splitter 102h configured to recombine the divided images.

It is noted that the optical system 102 is not limited to the configuration shown in FIG. 1 as long as it can guide the coming light 2 to the conversion unit 104 and guide the converted light rays to the image information generation unit 106. For example, any combination and arrangement of a relay lens, a mirror, and a polarizing beam splitter is employable. In Embodiment 1, an actual image obtained by the fluorescence microscope 3 is transmitted to the image information generation unit 106 through the relay optical system composed of the two relay lenses 102b, 102c and the relay optical system composed of the relay lens 102f and the mirror 102i or 102j. The relay optical system composed of two lenses is employed in the present embodiment. However, an optical system with a single lens is employable. It is noted that the lens 102b is arranged before the first polarizing beam splitter 102e.

The conversion unit 104 includes a first conversion section 104a configured to convert the coming light 2 with a first pupil function and a second conversion section 104b configured to convert the coming light 2 with a second pupil function. In general, a pupil function is a function with parameters of phase and intensity of light. It is noted that where the coming light 2 is fluorescent light, which means that the light is incoherent, each pupil function is a function with a parameter of light intensity. Here, each pupil function is represented by reflectivity on a light receiving plane of the conversion unit. Converted light rays converted with different pupil functions have different intensity distributions. Overlaying the different intensity distributions or extracting difference between the different intensity distributions can make difference between peak intensity and the other intensity more distinct. The first conversion section 104a and the second conversion section 104b are arranged at the position of the optical pupil (i.e., the position of focal length) of the first relay lens 102b. The first conversion section 104a and the second conversion section 104b include a reflecting member, for example. Here, a reflective liquid crystal mirror array is used as the reflecting member.

The image information generation unit 106 generates image information on the to-be-observed specimen 1 on the basis of the first converted light ray obtained by converting the coming light 2 with the first pupil function and the second converted light ray obtained by converting the coming light with the second pupil function. The image information generation unit 106 includes an image information obtaining section 106a configured to obtain the image information on the to-be-observed specimen 1 on the basis of an intensity distribution of the first converted light ray and an intensity distribution of the second converted light ray and an image information processing section 106b configured to process the image information obtained.

The function changing unit 108 changes at least one of the first pupil function provided to the first conversion section 104a and the second pupil function provided to the second conversion section 104b. The function changing unit 108 outputs a signal to at least one of the first conversion section 104a and the second conversion section 104b to change the corresponding pupil function. For example, in the case where each of the first conversion section 104a and the second conversion section 104b is a reflective liquid crystal mirror array, the function changing unit 108 can control the orientation of the liquid crystal molecules by applying voltage to the first conversion section 104a and the second conversion section 104b, thereby changing the corresponding pupil functions.

The position changing unit 110 changes the focal position of the coming light 2. For example, the position changing unit 110 can move the focal position of the coming light 2 in the direction of the optical axis. Here, the position changing unit 110 can move the fifth relay lens 102m in the direction of the optical axis.

With reference to FIG. 1, the light path of the coming light 2 coming from the to-be-observed specimen 1 will be described below. The coming light 2 having passed through the slit 102a is decomposed into two polarization components of a longitudinal wave and a transverse wave by the first polarizing beam splitter 102e. The longitudinal wave light is irradiated to the first conversion section 104a, while the transverse wave light is irradiated to the second conversion section 104b.

The polarization component of the longitudinal wave light irradiated to the first conversion section 104a is subjected to two-dimensional phase modulation, and the longitudinal wave light is reflected as the first converted light ray converted with the first pupil function provided to the first conversion section 104a. The polarization component of the transverse wave light irradiated to the second conversion section 104b is subjected to two-dimensional phase modulation, and the transverse wave light is reflected as the second converted light ray converted with the second pupil function provided to the second conversion section 104b. That is, of the longitudinal wave light and the transverse wave light decomposed by the first polarizing beam splitter 102e, only respective parts phase-modulated by the first conversion section 104a or the second conversion section 104b pass through the first polarizing beam splitter 102e, and are then transmitted to the image information generation unit 106 through the second relay lens 102c and the first mirror 102d. Since the first conversion section 104a and the second conversion section 104b are arranged at the position of the optical pupil, the two-dimensional distributions of the respective parts phase-modulated by the first conversion section 104a or the second conversion section 104b define pupil functions of the optical system composed of the first relay lens 102b and the second relay lens 102c.

The image obtained by the fluorescence microscope 3 passes through the second relay lens 102c to be once imaged, and is then transmitted to the image information generation unit 106 through the optical system thereafter to be imaged on a light receiving plane of the image information obtaining section 106a. The light having passed through the third relay lens 102f is divided again into two rays according to polarization components by the second polarizing beam splitter 102g. The two light rays pass through the fourth relay lens 102k or the fifth relay lens 102m, are combined together by the third polarizing beam splitter 102h, and are then transmitted to the image information obtaining section 106a. The image information obtaining section 106a is a CCD camera, for example.

As the first conversion section 104a and the second conversion section 104b, reflective liquid crystal mirror arrays were used herein each of which includes pixels having a size of 10.4 µm in arrays of 1400 columns and 1050 rows. Further, an epi-illumination fluorescence microscope was used as the fluorescence microscope 3. An objective lens having a numerical aperture of 1.45 and a magnification of 60× is selected as its objective lens. The relay optical system composed of the first relay lens 102b and the second relay lens 102c has a magnification of 5×.

FIG. 2 shows point spread distributions of a fluorescent bead observed with the observation system 100 set so that all the pixels absorb light in the second conversion section 104b, while all the pixels reflect light in the first conversion section 104a. In order to study the correlation between modification of a pupil function and a point spread distribution in the conversion unit 104, only the first conversion section 104a was used, and a light path including the second conversion section 104b was not used. Under the above conditions, all of the phases of the small arrays in the first conversion section 104a were shifted by π/4. Then, the fluorescent bead, which has a diameter of 100 nm, was measured.

Figure 2A:
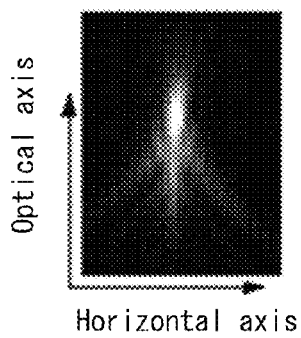
FIG. 2A is a graph representation showing a point spread distribution in the X-Z plane.
Figure 2B:
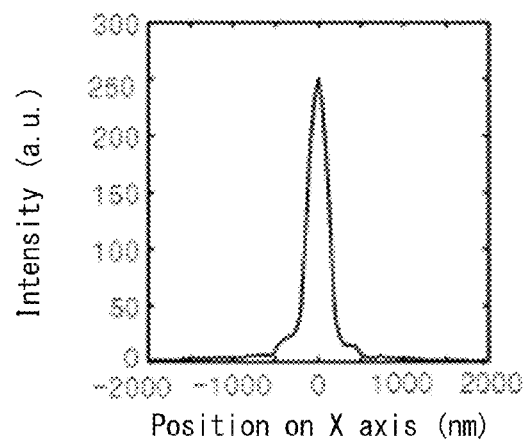
FIGS. 2B and 2C are graph representations showing its point spread distributions in the X direction and the Z direction, respectively.
Figure 2C:
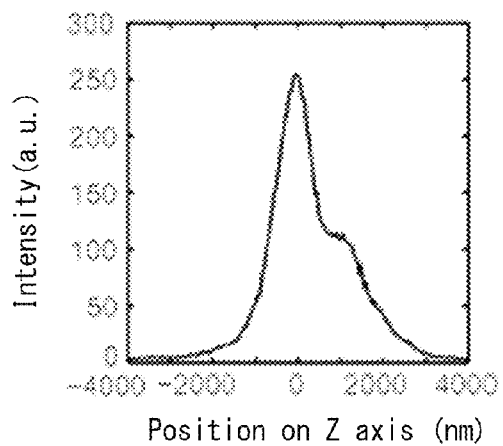

FIG. 2A shows a point spread distribution of the florescent bead in the X-Z plane. The axis of abscissa indicates the horizontal axis (X axis), while the axis of ordinate indicates the optical axis (Z axis). The first conversion section 104a is non-shielded at any points on its light receiving plane. This means that every pixel reflects light on the light receiving plane of the first conversion section 104a. FIG. 2B shows a point spread distribution in the X direction. The axis of abscissa indicates the position on the X axis, while the axis of ordinate indicates light intensity. The point spread distribution in the X direction shows the horizontal resolution of the microscope. The point spread distribution emitted from a point smaller than the diffraction limit approximately follows a Gaussian distribution. The resolution of the microscope is defined by the half width of the point spread distribution shown in FIG. 2B. According to the observation system 100, the horizontal resolution was 225 nm. FIG. 2C shows a point spread distribution in the Z direction. The axis of abscissa indicates the position on the Z axis, while the axis of ordinate indicates light intensity. The point spread distribution in the Z direction shows the optical axial resolution of the microscope. In theory, the point spread distribution emitted from a point smaller than the diffraction limit approximately follows a Gaussian distribution also in the Z direction. However, as shown FIG. 2C, the distribution deviates from the Gaussian distribution due to the presence of spherical aberration in the optical system that forms an image. The spherical aberration may cause reduction in optical axial resolution of the microscope. According to the observation system 100, the optical axial resolution was 1472 nm.

FIG. 3 presents point spread distributions of a fluorescent bead observed with the observation system 100, which is set so that all the pixels absorb light in the second conversion section 104b, and various pupil functions in donut shape are provided to the first conversion section 104a. In FIG. 3, each region in donut shape that is surrounded by an inner ring and an outer ring functions as a non-shielded region of a pupil function. Here, the inner rings and the outer rings are almost circular in shape. The diameters of the circles corresponding to the outer rings are larger than the diameters of the circles corresponding to the corresponding inner rings. It is noted that each pupil function can be changed by changing the phase of the region surrounded by the inner ring and the outer ring or changing the transmittance or reflectivity of the surrounded region. For example, the degree that the phase of the surrounded region is changed is $\pi/4$. In FIG. 3, each pupil has a shape of a pupil function provided thereto. Each point spread function (PSF) shows a point spread distribution in the X-Z plane. In each drawing showing a point spread distribution in the X direction similarly to FIG. 2, the axis of abscissa indicates the position on the X axis, while the axis of ordinate indicates light intensity. In each drawing showing a point spread distribution in the Z direction similarly to FIG. 2, the axis of abscissa indicates the position on the Z axis, while the axis of ordinate indicates light intensity.

Figures 3A, 3B, 3C:
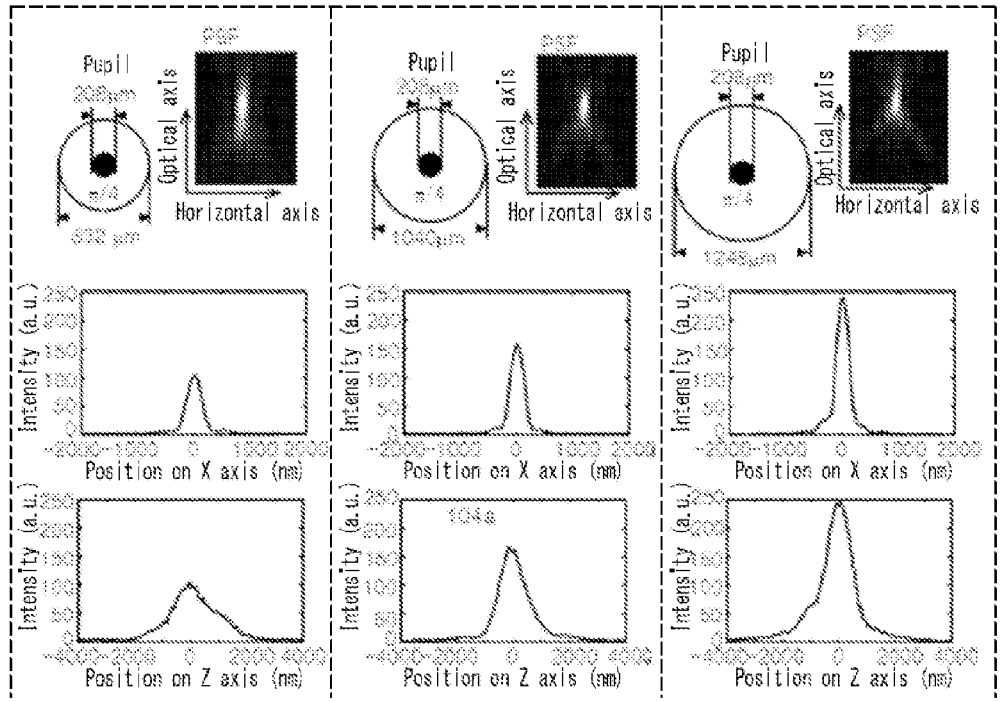
FIG. 3 shows point spread distributions of a fluorescent bead observed with the observation system, which is set so that all pixels of the second conversion section absorb light, and various pupil functions in donut shape are provided to the first conversion section, wherein each of FIG. 3A-3F presents a pupil function, a point spread distribution in the X-Z plane, a graph of a point spread distribution in the X direction, and a graph of a point spread distribution in the Z direction.
Figures 3D, 3E, 3F:
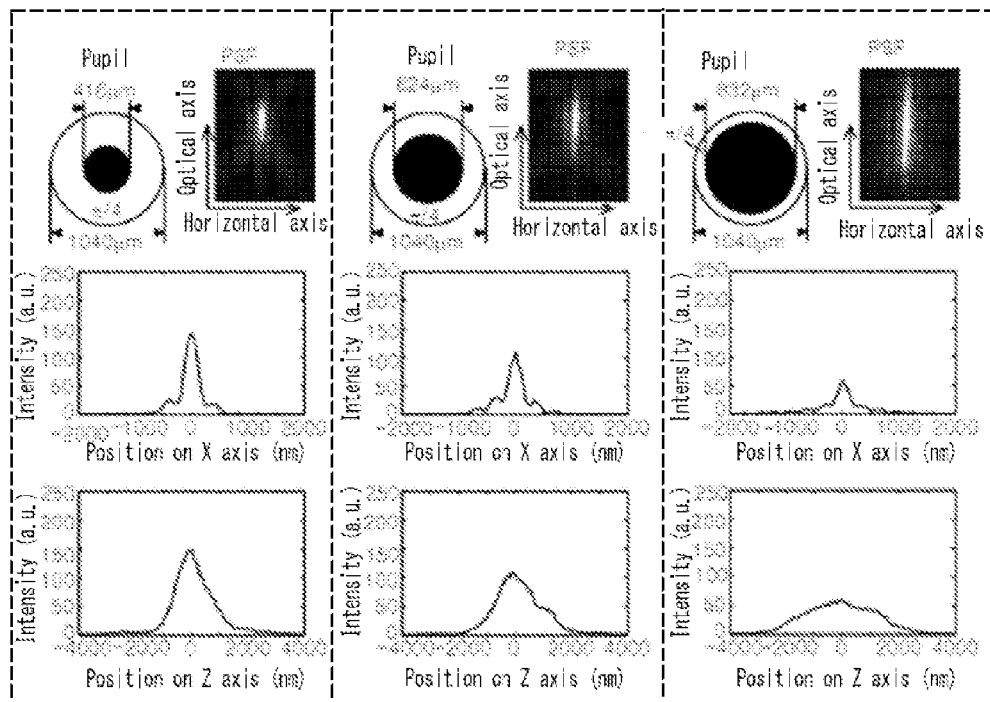

FIG. 3A shows point spread distributions of the fluorescent bead observed with the observation system 100, which is set so that a pupil function in donut shape with an inner ring having a diameter of 208 μm and an outer ring having a diameter of 832 μm is provided to the first conversion section 104a. FIG. 3B shows point spread distributions of the fluorescent bead observed with the observation system 100, which is set so that a pupil function in donut shape with an inner ring having a diameter of 208 μm and an outer ring having a diameter of 1040 μm is provided to the first conversion section 104a. FIG. 3C shows point spread distributions of the fluorescent bead observed with the observation system 100, which is set so that a pupil function in donut shape with an inner ring having a diameter of 208 μm and an outer ring having a diameter of 1248 μm is provided to the first conversion section 104a. FIG. 3D shows point spread distributions of the fluorescent bead observed with the observation system 100, which is set so that a pupil function in donut shape with an inner ring having a diameter of 416 μm and an outer ring having a diameter of 1040 μm is provided to the first conversion section 104a. FIG. 3E shows point spread distributions of the fluorescent bead observed with the observation system 100, which is set so that a pupil function in donut shape with an inner ring having a diameter of 624 μm and an outer ring having a diameter of 1040 μm is provided to the first conversion section 104a. FIG. 3F shows point spread distributions of the fluorescent bead observed with the observation system 100, which is set so that a pupil function in donut shape with an inner ring having a diameter of 832 μm and an outer ring having a diameter of 1040 μm is provided to the first conversion section 104a. In each example shown in FIGS. 3A-3F, the value of the ratio between the diameter of the inner ring and the diameter of the outer ring in the donut shape is set in the range from 1/6 to 4/5.

Providing a pupil function in donut shape to the conversion unit 104 can increase the optical axial resolution. This might be because the pupil function in donut shape can reduce the influence of the spherical aberration. The pupil function in donut shape shields light in a part (central part) defined as a region inside the inner ring and does not substantially shield light in a part (surrounding part) defined as a region between the outer ring and the inner ring. For example, the pupil function is set so that the intensity of reflected light is almost zero in the part defined as the region inside the inner ring and is almost 1 (normalized by a maximum value) in the part defined as the region between the outer ring and the inner ring. It is noted that the light intensity (intensity of reflected light herein) of a part defined as a region outside the outer ring is zero. Thus, the conversion unit 104 modulates the intensity of the coming light 2 to convert the coming light 2 to a converted light ray.

It is noted that in the case where reflective liquid crystal mirror arrays are used as the first and second conversion sections 104a, 104b, appropriate adjustment of the reflectivity of each pixel on the light receiving plane can obtain any pupil function. Further, it can be said that a point spread distribution corresponds to a power spectrum of Fourier transform of a pupil function, and the part corresponding to the inside of the inner ring in the aforementioned pupil function in donut shape corresponds to a low frequency component of the point spread distribution. For this reason, elimination of light in this part can increase the resolution.

For example, when the pupil function (see FIG. 3B) in donut shape with an outer ring having a diameter of 1040 μm and an inner ring having a diameter of 208 μm was provided, the horizontal resolution and the optical axial resolution were 233 nm and 942 nm, respectively. Provision of an appropriate donut shape as a pupil function can increase the optical axial resolution without reducing the horizontal resolution. To increase the optical axial resolution in an optical microscope means to exhibit equivalent effects to those of a confocal optical microscope, and in turn, means that a fluorescence cross-section image can be obtained.

Figure 4:
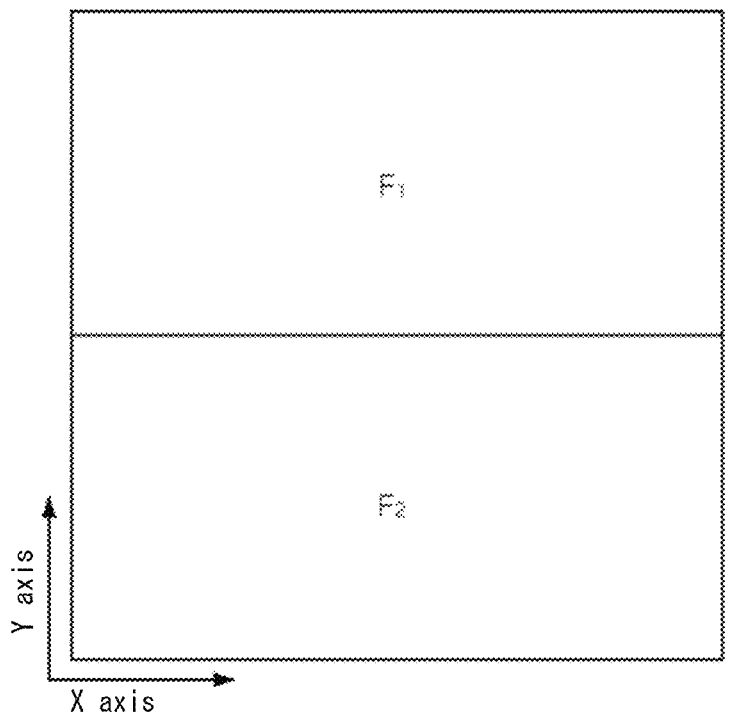
FIG. 4 is a conceptual diagram showing an image that an image information generation unit obtains.

FIG. 4 is a conceptual diagram showing an image that the image information generation unit 106 obtains. Different pupil functions can be provided to the first conversion section 104a and the second conversion section 104b. Accordingly, the image information generation unit 106 can obtain, as a single image, images on the basis of the converted light rays converted with the different two pupil functions (the first pupil function and the second pupil function). When the slit 102a adjusts the field of view optimally to adjust the two light paths, a single image can be obtained in which images, to which different two pupil functions are provided, are arranged side by side vertically or transversely.

An image $F_1$ is an image based on the converted light ray converted by the first conversion section 104a, while an image $F_2$ is an image based on the converted light ray converted by the second conversion section 104b. It is noted that although FIG. 4 shows the images $F_1$, $F_2$ in the X-Y plane, the images $F_1$, $F_2$ include components in the direction of the optical axis (Z axis) as well as those in the directions of the X axis and the Y axis. The images $F_1$, $F_2$ including the components in the X, Y, and Z directions can be obtained by moving the objective lens of the fluorescence microscope 3 in the direction of the optical axis (Z axis).

The image information processing section 106b can perform addition, subtraction, or multiplication on the image $F_1$ and the image $F_2$ obtained from the image information obtaining section 106a. For example, a pupil function in donut shape having an outer diameter of 1040 μm and an inner diameter of 208 μm is provided to the first conversion section 104a, while a pupil function in donut shape having an outer diameter of 1040 μm and an inner diameter of 832 μm is provided to the second conversion section 104b. The point spread distribution of the image $F_1$ is shown in FIG. 3B. The point spread distribution of the image $F_2$ is shown in FIG. 3F. The image information processing section 106b divides a single image obtained from the image information obtaining section 106a into the image $F_1$ and the image $F_2$, performs addition, subtraction or multiplication on the image $F_1$ and the image $F_2$ to form a new single image. It is noted that the unit of the result of the addition or subtraction indicates light intensity. By contrast, the unit of the result of the multiplication does not indicate light intensity but corresponds to light intensity. Therefore, even when the first pupil function is equal to the second pupil function, the result of the multiplication can be utilized. For example, when the second conversion section 104b is moved to slightly change the light path length of the optical system that allows light to pass through the second conversion section 104b, and the image $F_1$ is multiplied by the image $F_2$, the resolution can be increased.

According to the observation system 100 in the present embodiment, the image information on the to-be-observed specimen 1 is generated on the basis of the first converted light ray obtained by converting the coming light 2 with the first pupil function and the second converted light ray obtained by converting the coming light 2 with the second pupil function. Converted light rays reflected with different pupil functions have different intensity distributions. Overlaying the different intensity distributions or extracting difference between the different intensity distributions can make difference between the peak intensity and the other intensity more distinct, thereby suppressing a spread of the intensity distribution of the coming light coming from a to-be-observed specimen. As a result, a clear image from which blurs are eliminated can be obtained from the cross-section image information obtained by utilizing the coming light coming from the to-be-observed specimen. Further, the conversion unit 104 of the observation system 100 includes the first conversion section 104a and the second conversion section 104b. That is, the conversion unit 104 is composed of the first conversion section 104a and the second conversion section 104b, which are provided separately. This enables simultaneous conversion of the coming light 2 to the first converted light ray and the second converted light ray, thereby achieving speedy, reliable, and efficient generation of image information with less blur.

FIG. 5 shows point spread distributions of a fluorescent bead observed with the observation system 100 in which the first pupil function (see FIG. 3B) in donut shape with an outer ring having a diameter of 1040 μm and an inner ring having a diameter of 208 μm is provided to the first conversion section 104a, while the second pupil function (see FIG. 3F) in donut shape with an outer ring having a diameter of 1040 μm and an inner ring having a diameter of 832 μm is provided to the second conversion section 104b. The image information was generated on the basis of difference (by subtraction) in intensity between the first converted light ray converted with the first pupil function and the second converted light ray converted with the second pupil function.

Figure 5A:
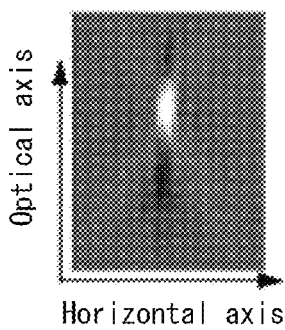
FIG. 5A is a graph representation showing a point spread distribution in the X-Z plane.
Figure 5B:
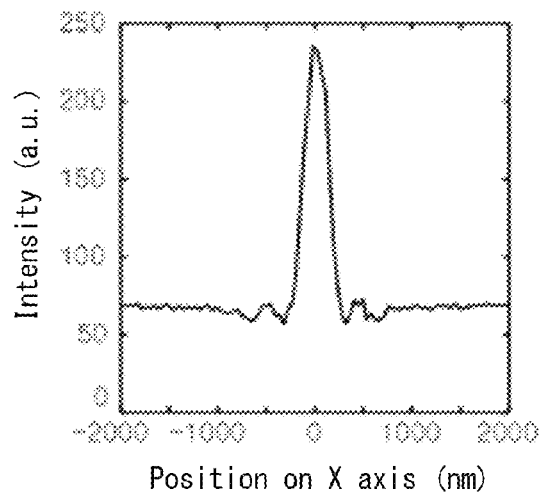
FIGS. 5B and 5C are graph representations showing its point spread distributions in the X direction and the Z direction, respectively.
Figure 5C:
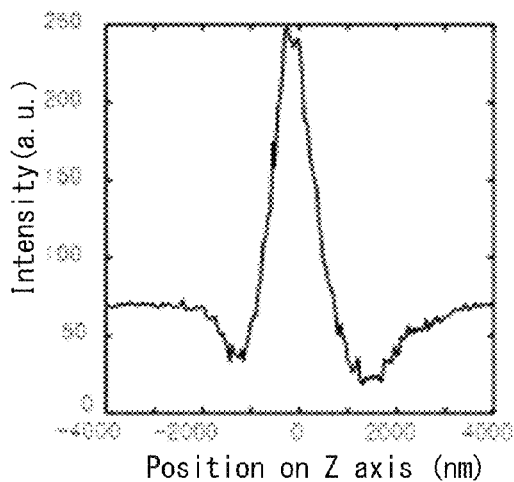

FIG. 5A shows the point spread distribution in the X-Z plane. The axis of abscissa indicates the horizontal axis, while the axis of ordinate indicates the optical axis. FIG. 5B shows the point spread distribution in the X direction. The axis of abscissa indicates the position on the X axis, while the axis of ordinate indicates light intensity. FIG. 5C shows the point spread distribution in the Z direction. The axis of abscissa indicates the position on the Z axis, while the axis of ordinate indicates light intensity. In FIG. 5C, the distribution function showed a shape like a Laplacian filter. The Laplacian filter provides an effect of intensifying edges (boundaries) in an image in image processing. FIG. 5C shows vertical asymmetry along the Z axis, but the edge is further intensified in the Z direction.

According to the observation system 100, each of the first pupil function and the second pupil function is a function in donut shape having an inner ring and an outer ring. The first conversion section 104a and the second conversion section 104b make the regions surrounded by the inner rings and the outer rings to serve as non-shielded regions of the first pupil function and the second pupil function, respectively. Accordingly, the coming light 2 that reaches the regions outside the outer rings of the donut shapes in the conversion unit 104 can be prevented from being reflected. Thus, the influence of spherical aberration caused in the presence of the optical system in the observation system 100 can be reduced, thereby increasing the optical axial resolution. On the other hand, the coming light that reaches the regions inside the inner rings of the donut shapes in the conversion unit 104 can be prevented from being reflected. Thus, influence of light with much noise that reaches the regions inside the inner rings of the donut shapes can be eliminated. As a result, a further clear image can be obtained.

FIG. 6 shows point spread distributions of a fluorescent bead obtained after the focal length of the coming light 2 is changed by moving the second conversion section 104b. The first pupil function (see FIG. 3B) in donut shape with an outer ring having a diameter of 1040 μm and an inner ring having a diameter of 208 μm is provided to the first conversion section 104a, while the second pupil function (see FIG. 3F) in donut shape with an outer ring having a diameter of 1040 μm and an inner ring having a diameter of 832 μm is provided to the second conversion section 104b. The light path length of the optical system that allows light to pass through the second conversion section 104b was slightly changed by moving the second conversion section 104b, thereby changing the focal length of the light by 200 nm. It is noted that the position changing unit 110 can change the focal length also by moving the fifth relay lens 102m in the direction of the optical axis. After the focal length was changed, the image information was generated on the basis of difference (by subtraction) in intensity between the first converted light ray converted with the first pupil function and the second converted light ray converted with the second pupil function.

Figure 6A:
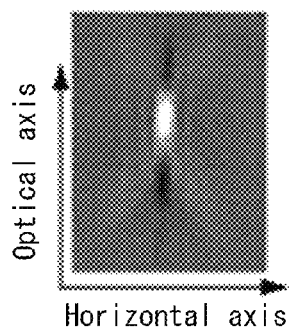
FIG. 6A is a graph representation showing a point spread distribution in the X-Z plane.
Figure 6B:
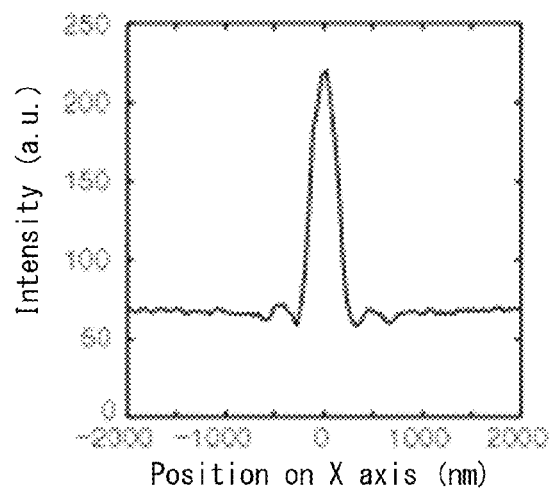
FIGS. 6B and 6C are graph representations showing its point spread distributions in the X direction and the Z direction, respectively.
Figure 6C:
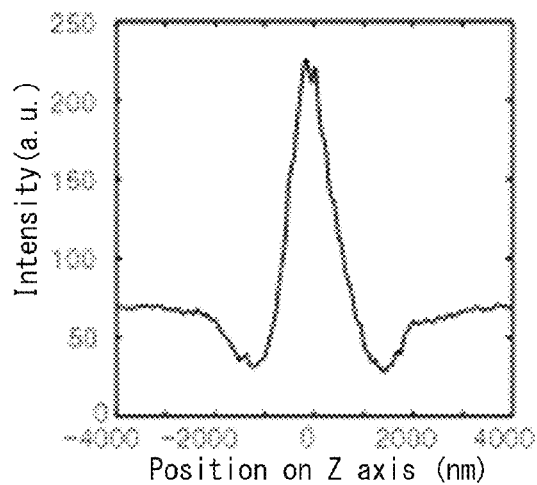

FIG. 6A shows the point spread distribution in the X-Z plane. The axis of abscissa indicates the horizontal axis, while the axis of ordinate indicates the optical axis. FIG. 6B shows the point spread distribution in the X direction. The axis abscissa indicates the position on the X axis, while the axis of ordinate indicates light intensity. FIG. 6C shows the point spread distribution in the Z direction. The axis abscissa indicates the position on the Z axis, while the axis of ordinate indicates light intensity. Comparison of FIG. 6C with FIG. 5C proves that the point spread distribution in FIG. 6C is vertically symmetrical along the Z axis to further intensify the edge in the Z direction. The horizontal resolution was 222 nm. The optical axial resolution was 702 nm. The optical axial resolution in FIG. 6 was increased to nearly double when compared with the example described with reference to FIG. 2. In addition, an equivalent horizontal resolution was obtained.

The function changing unit 108 of the observation system 100 can change at least one of the first pupil function and the second pupil function. For example, even when a combination of the first pupil function and the second pupil function obtains image information with multiple blurs unsuitable for observation, an image with desired resolution with less blur can be obtained by appropriately changing at least one of the first pupil function and the second pupil function.

Further, the position changing unit 110 of the observation system 100 can change the focal position of the coming light 2. Changing the focal position of the coming light 2 corresponds to changing the light path length to the focal point of the coming light 2. Accordingly, a spread in the intensity distribution of the coming light 2 can be changed. Thus, even when a combination of the first pupil function and the second pupil function only can lead to insufficient resolution, an image with desired resolution with less blur can be obtained by changing the focal position of the coming light.

It is noted that in the observation system 100, as long as the focal position of the coming light 2 can be changed, a method of changing the focal position of the coming light 2 is not limited to moving the fifth relay lens 102*m* in the direction of the optical axis by the position changing unit 110. For example, moving the first conversion section 104*a* or the second conversion section 104*b* by the position changing unit 110 can change the focal position of the coming light 2.

Figure 7A:
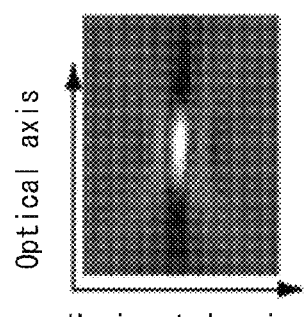
FIG. 7A is a graph representation showing a point spread distribution in the X-Z plane.
Figure 7B:
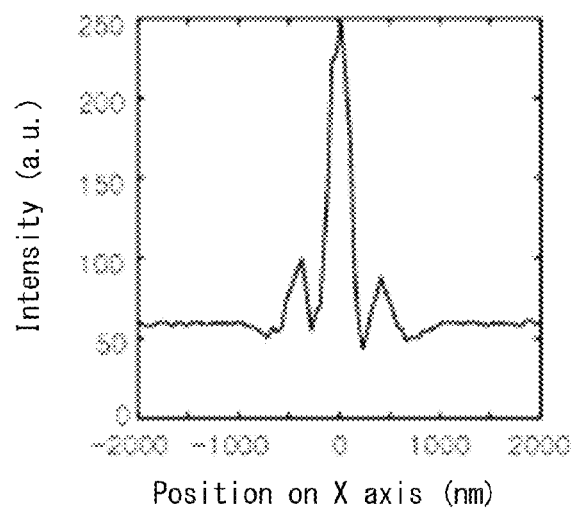
FIGS. 7B and 7C are graph representations showing its point spread distributions in the X direction and the Z direction, respectively.
Figure 7C:
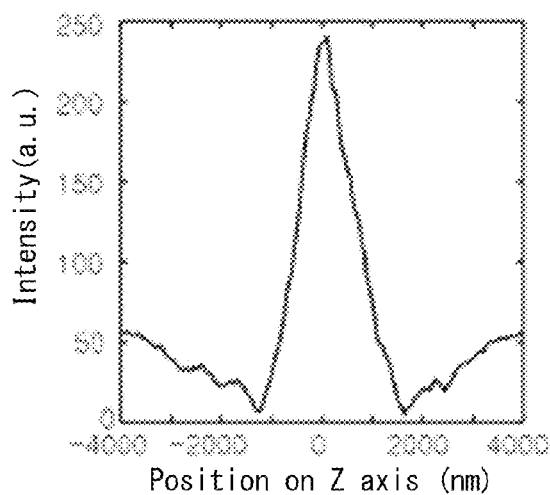

FIG. 7 shows point spread distributions of a fluorescent bead observed with the observation system 100 in which a first pupil function in donut shape with an outer ring having a diameter of 1040 μm and an inner ring having a diameter of 832 μm is provided to the first conversion section 104*a*, while a second pupil function in donut shape with an outer ring having a diameter of 624 nm and an inner ring having a diameter of 208 μm is provided to the second conversion section 104*b*. The focal length of the second converted light ray converted by the second conversion section 104*b* was changed to slightly change the focal length of the optical system. The position changing unit 110 moved the fifth relay lens 102*m* in the direction of the optical axis to change the focal length of the second converted light ray converted by the second conversion section 104*b*. After the focal length was changed, the image information was generated on the basis of difference (by subtraction) in intensity between the first converted light ray converted with the first pupil function and the second converted light ray converted with the second pupil function FIG. 7A shows the point spread distribution in the X-Z plane. The axis of abscissa indicates the horizontal axis, while the axis of ordinate indicates the optical axis. FIG. 7B shows the point spread distribution in the X direction. The axis of abscissa indicates the position on the X axis, while the axis of ordinate indicates light intensity. FIG. 7C shows the point spread distribution in the Z direction. The axis of abscissa indicates the position on the Z axis, while the axis of ordinate indicates light intensity.

The function changing unit 108 can change at least one of the first pupil function and the second pupil function by, for example, applying voltage to the first conversion section 104*a* and the second conversion section 104*b*. In turn, the point spread distributions of the image $F_1$ and the image $F_2$ can be changed. Further, after the focal lengths of the first and second converted light rays respectively forming the image $F_1$ and the image $F_2$ are changed, the respective image information can be computed. Thus, an image having any of various point spread distributions can be obtained from a combination of them.

The focal position for obtaining the image $F_2$ through the second conversion section 104*b* is adjusted so that the result of edge detection along the optical axis becomes vertically symmetrical along the Z axis. Under the above conditions, the optical axial resolution was 744 nm. Comparison with that under the conditions shown in FIG. 6 showed the inferiority in edge detectability in the direction of the optical axis. However, the horizontal resolution was 170 nm, which exceeds the diffraction limit. Given that such reduction in resolution in the direction of the optical axis is admitted, when a pupil function in donut shape with an outer ring having a diameter of 1248 μm and an inner ring having a diameter of 832 μm is provided to the first conversion section 104*a*, while a pupil function in donut shape with an outer ring having a diameter of 624 μm and an inner ring having a diameter of 208 μm is provided to the second conversion section 104*b*, and a difference image between the image $F_1$ and the image $F_2$ is obtained, the optical axial resolution and the horizontal resolution can be increased to 962 nm and 142 nm, respectively. An observer can specify a point spread distribution optimum for the to-be-observed specimen 1. Further, changing the magnification and/or numerical aperture of the objective lens can result in specification of the optimum point spread distribution.

Here, the value of the ratio between the diameter of the inner ring and that of the outer ring in each donut shape is ⅙ to ⅘. When the value of the ratio between the diameter of the inner ring and that of the outer ring in each donut shape falls in such the range, the spread in the intensity distribution of the coming light 2 can be reliably suppressed. Accordingly, a clear image from which blurs are eliminated can be obtained from the cross-section image information obtained by utilizing the coming light 2.

Figure 8A:
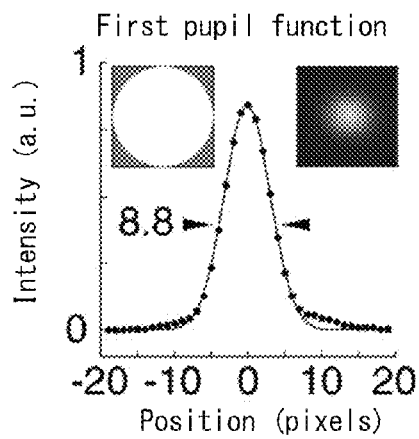
FIG. 8A is a graph representation illustrating a first pupil function and its point spread distributions.

Next, an increase in resolution by the observation system 100 will be described with reference to FIG. 8. FIG. 8A shows a first pupil function and a point spread distribution. The region (non-shielded region) where light is not substantially shielded is indicated white in the first pupil function. The non-shielded region is almost circular in shape in the first pupil function.

Referring to the graph representation showing the point spread distribution, the axis of abscissa indicates the unit number of the pixels of the CCD camera. As can be understood from the graph representation, the distribution of the light intensity approximately follows a Gaussian distribution. The half width in the graph representation corresponds to the resolution. The half width in this graph representation is 8.8.

Figure 8B:
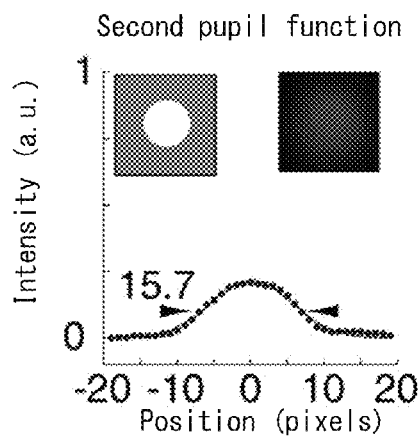
FIG. 8B is a graph representation illustrating a second pupil function and its point spread distributions.

FIG. 8B shows a second pupil function and a point spread distribution. The non-shielded region is indicated white in the second pupil function. Further, the non-shielded region is also almost circular in shape in the second pupil function. However, the non-shielded region in the second pupil function is smaller than that in the first pupil function. It can be said that the second pupil function is apodized by the first pupil function. As shown in FIG. 8B, reduction in size of the non-shielded region reduces not only the peak intensity of the light but also the resolution of the light. The half width in this graph showing the point spread distribution is 15.7.

Figure 8C:
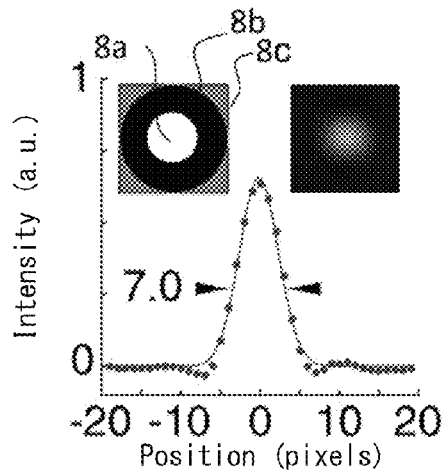
FIG. 8C is a graph representation showing difference between the first pupil function and the second pupil function and difference between their point spread distributions.

FIG. 8C shows the difference between the first pupil function and the second pupil function and the difference in point spread distribution therebetween. In FIG. 8C, a region 8*a* is a region serving as a non-shielded region for both the first pupil function and the second pupil function. A region 8*b* is a region where light shielding is different between the first pupil function and the second pupil function. A region 8*c* is a region serving as a shielded region for both the first pupil function and the second pupil function. The half width in the graph of the point spread distribution shown in FIG. 8C is 7.0. Thus, the difference in point spread distribution between the different pupil functions can increase the resolution.

Furthermore, the observation system 100 can obtain a clear image from a one-flame image. The time resolution of the observation system 100 depends on the resolution of the image information generation unit 106. For example, the observation system 100 can obtain an image at 500 Hz. Thus, the observation system 100 has a time resolution that is several ten times to several hundred times that of a general scanning type fluorescence microscope. Accordingly, the observation system 100 can be suitably used for observation of, for example, biomaterials.

It is noted that an objective lens having a magnification of 60× is used as the objective lens of the fluorescence microscope 3 in the above description, but the magnification of the objective lens is not limited specifically. For example, an objective lens having a magnification of 150× may be used.

Figure 9A:
FIG. 9A is a schematic diagram showing that light is not shielded.
Figure 9B:
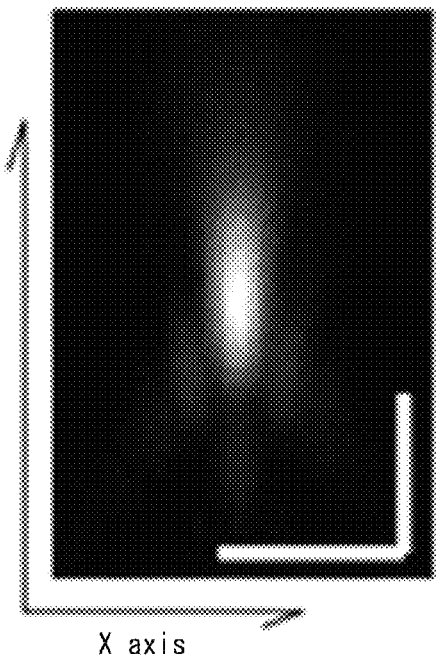
FIG. 9B is a graph representation showing its point spread distribution in the X-Z plane.

Description of the result obtained using an objective lens having a magnification of 150× will be described with reference to FIGS. 9-14. FIG. 9A is a schematic diagram showing a state where light is not shielded. This state can be realized by, for example, setting all the pixels of the reflective liquid crystal mirror arrays so as to exhibit the maximum reflectivity. FIG. 9B shows a point spread distribution in the X-Z plane where a shielded region (non-shielded region) is set as shown in FIG. 9A. A to-be-observed specimen (e.g., a fluorescent bead having a diameter of 100 nm) smaller in size than the diffraction limit of the microscope is used also herein as the to-be-observed specimen.

Figure 10A:
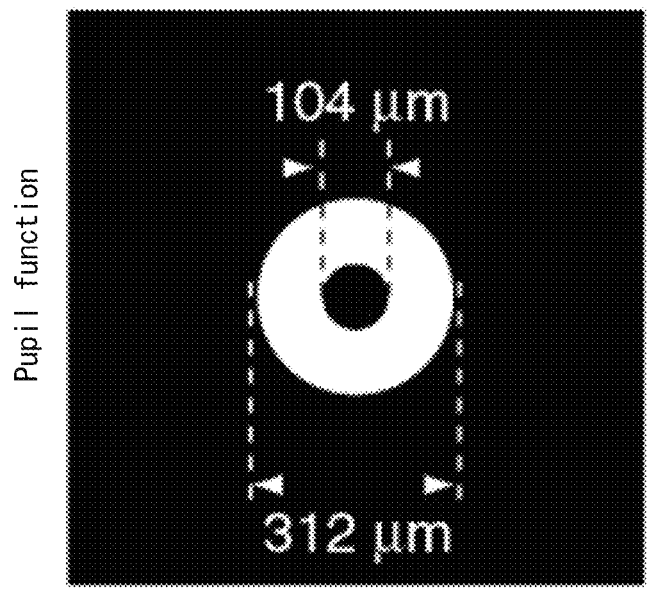
FIG. 10A is an illustration showing a first pupil function.
Figure 10B:
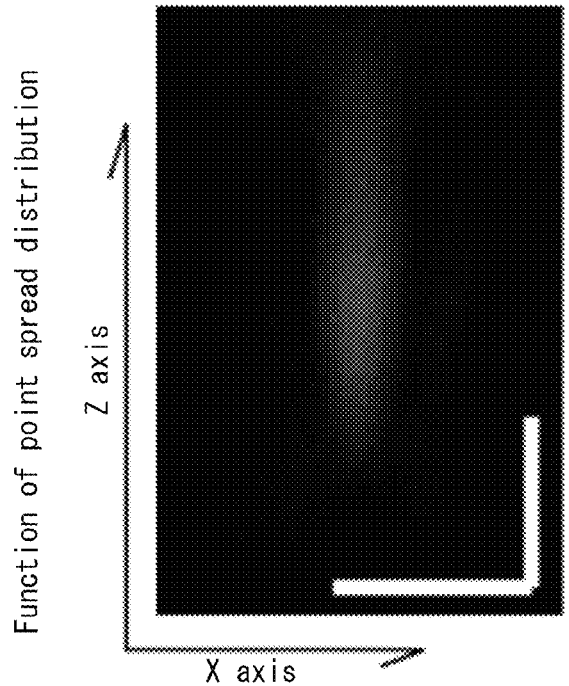
FIG. 10B is a graph representation showing its point spread distribution in the X-Z plane.

FIG. 10A shows a first pupil function. The first pupil function is a function in donut shape defined by an inner ring and an outer ring. The first pupil function does not shield from the light the region between the inner ring and the outer ring and shields from the light the region surrounded by the inner ring and the region outside the outer ring. It is noted that the diameter of the circle defining the inner ring is 104 μm, and the diameter of the circle defining the outer ring is 312 μm. FIG. 10B shows the point spread distribution according to the first pupil function.

Figure 11A:
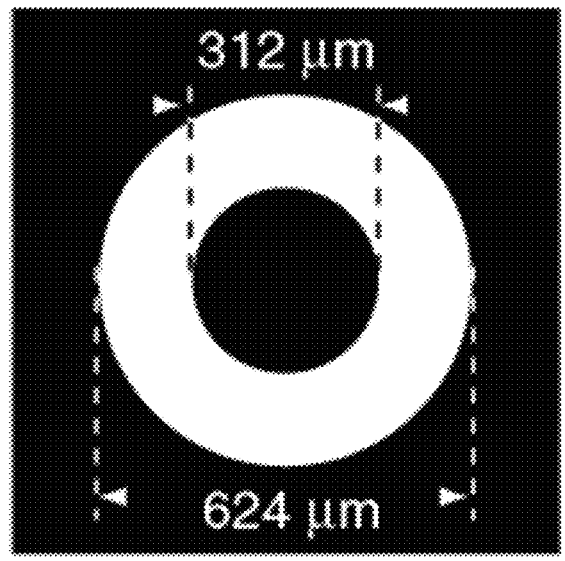
FIG. 11A is an illustration showing a second pupil function.
Figure 11B:
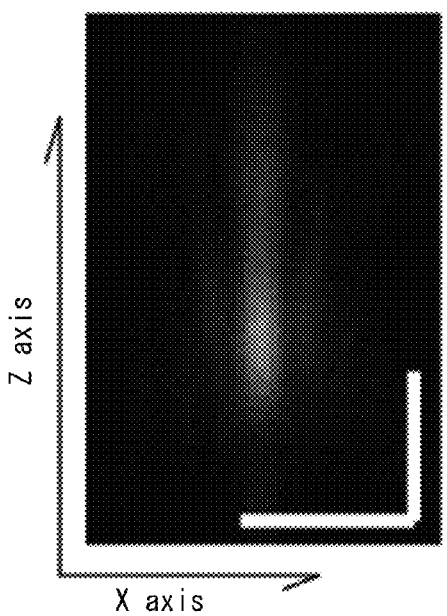
FIG. 11B is a graph representation showing its point spread distribution in the X-Z plane.

FIG. 11A shows a second pupil function. The second pupil function is also a function in donut shape defined by an inner ring and an outer ring. The second pupil function also does not shield from the light the region between the inner ring and the outer ring and shields from the light the region surrounded by the inner ring and the region outside the outer ring. It is noted that the diameter of the circle defining the inner ring is 312 μm, and the diameter of the circle defining the outer ring is 624 μm. FIG. 11B shows the point spread distribution according to the second pupil function.

Figure 12A:
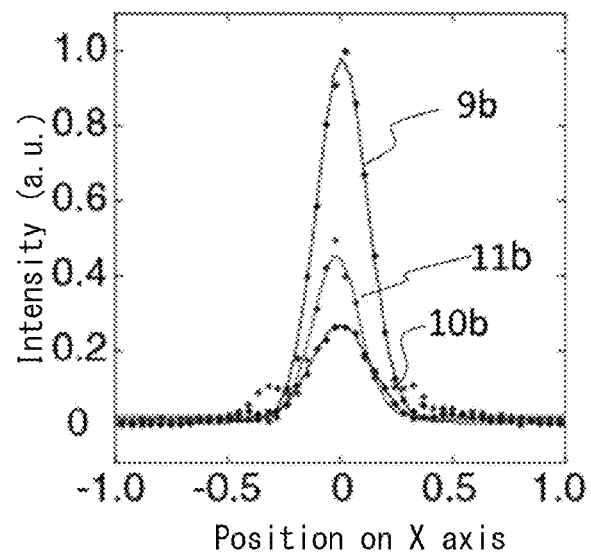
FIG. 12A is a graph representation showing the point spread distributions in the X direction shown in FIG. 9B, FIG. 10B, and FIG. 11B.

FIG. 12A shows point spread distributions in the X direction indicated at 9b, 10b, and 11b, which are shown in FIGS. 9B, 10B, and 11B, respectively. With no shielded region, the peak intensity of the light is comparatively high. In this case, the horizontal resolution is 226 nm. Further, setting a pupil function in donut shape can reduce the peak intensity.

Figure 12B:
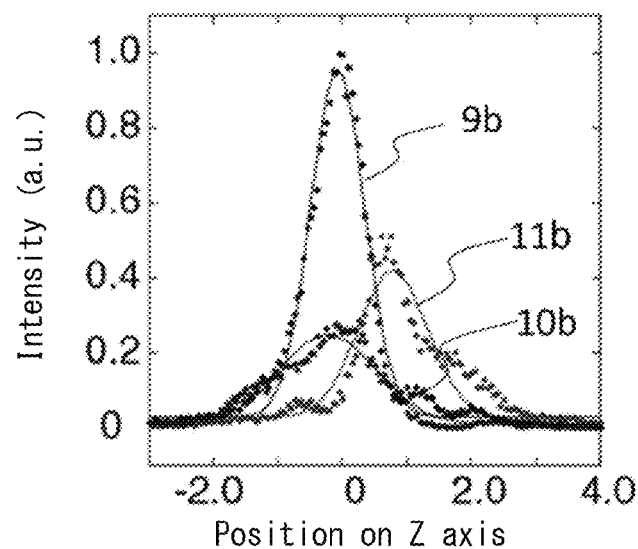
FIG. 12B is a graph representation showing the point spread distributions in the Z direction shown in FIG. 9B, FIG. 10B, and FIG. 11B.

FIG. 12B shows point spread distributions in the Z direction indicated at 9b, 10b, 11b, which are shown in FIG. 9B, 10B, and 11B, respectively. With no shielded region, the peak intensity of the light is comparatively high. In this case, the optical axial resolution is 940 nm. It is noted that larger the shielded region is, the lower the peak intensity is. Setting a pupil function in donut shape shifts the peak intensity from zero herein.

Figure 13A:
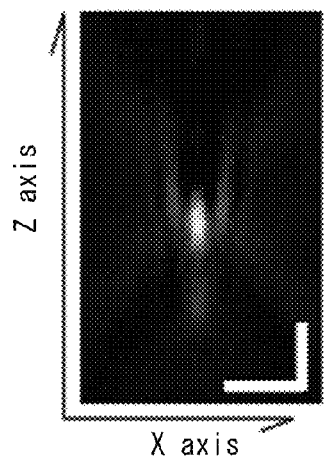
FIG. 13A shows the difference between the point spread distributions between first and second pupil functions.
Figure 13B:
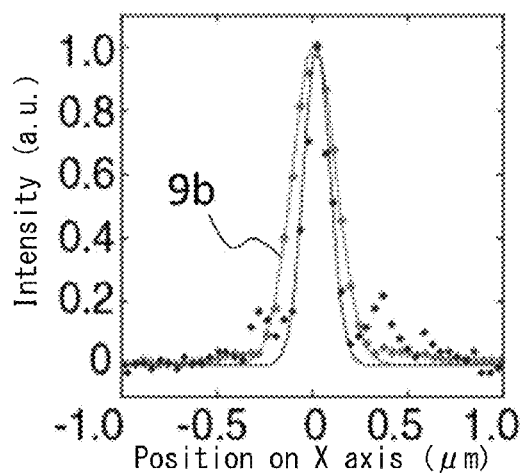
FIGS. 13B and 13C are graph representations showing their point spread distributions in the X direction and the Z direction, respectively.
Figure 13C:
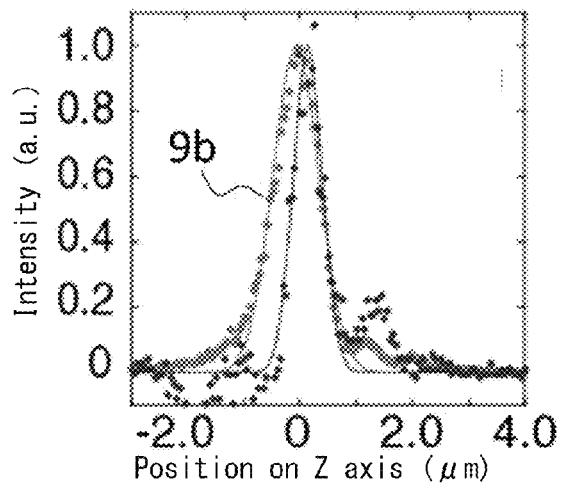

FIG. 13A shows the difference in point spread distribution between the first and second pupil functions. In FIG. 13A, the axis of abscissa indicates the X axis, while the axis of ordinate indicates the Z axis. FIG. 13B shows the point spread distribution in the X direction. FIG. 13C shows the point spread distribution in the Z direction. The resolution in the horizontal direction is 147 nm. The optical axial resolution is 525 nm. For reference, the point spread distribution where the light is not shielded is indicated at 9b in FIGS. 13B and 13C. Thus, the difference in point spread distribution between the different pupil functions can increase the horizontal resolution and the optical axial resolution.

Moreover, as described above, change in focal position of the coming light can further increase the horizontal resolution and the vertical resolution.

Figure 14A:
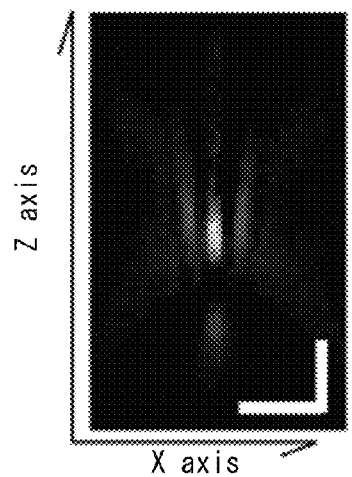
FIG. 14A is a graph representation showing a point spread distribution observed with the observation system, from which the result shown in FIG. 13A is obtained, after the focal length of the coming light is changed.
Figure 14B:
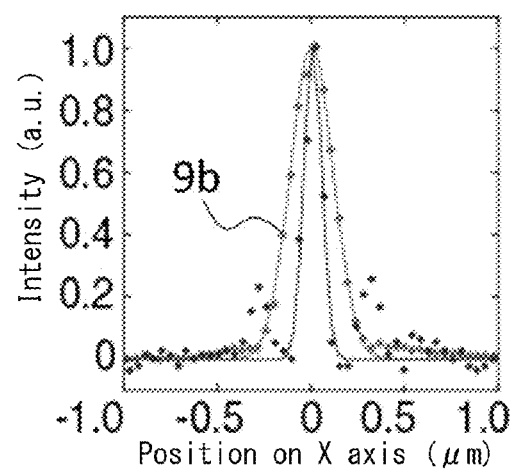
FIGS. 14B and 14C are graph representations showing its point spread distributions in the X direction and the Z direction, respectively, in FIG. 14A.
Figure 14C:
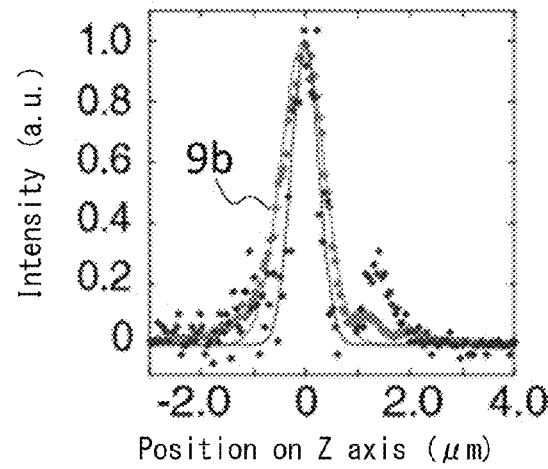

FIG. 14A shows the difference in point spread distribution obtained by appropriately moving the fourth and fifth relay lenses 102k, 102m in the observation system 100 shown in FIG. 1. FIG. 14B shows the point spread distribution in the X direction. FIG. 14C shows the point spread distribution in the Z direction. The horizontal resolution is 108 nm. The optical axial resolution is 463 nm. For reference, the point spread distribution where the light is not shielded is indicated at 9b in FIGS. 14B and 14C. Thus, adjusting the focal position of the coming light can further increase the horizontal resolution and the optical axial resolution.

It is noted that although the difference in point spread distribution between the different pupil functions in the observation system 100 is similar to digital image processing (digital high-pass filtering), the observation system 100 can further increase the resolutions (especially, the optical axial resolution) compared with the digital image processing. Difference between the difference in point spread distribution in the observation system 100 and digital image processing will be described below with reference to FIGS. 15-18. Here, Gaussian filtering is performed as the digital image processing.

Figure 15A:
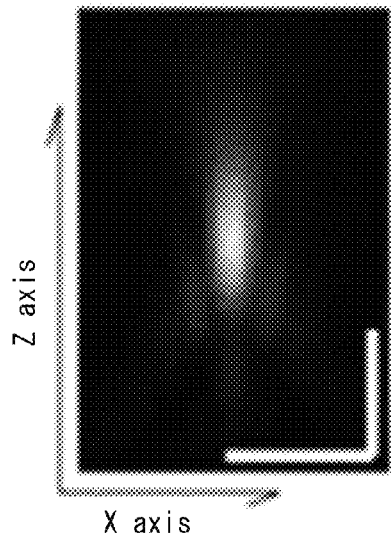
FIG. 15A is a graph representation showing a point spread distribution in the X-Z plane.
Figure 15B:
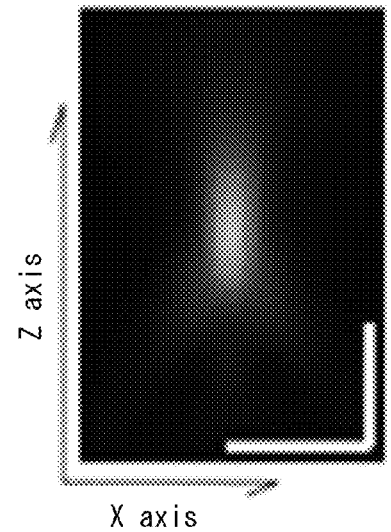
FIGS. 15B-15D are graph representations showing point spread distributions obtained by digital image processing.
Figure 15C:
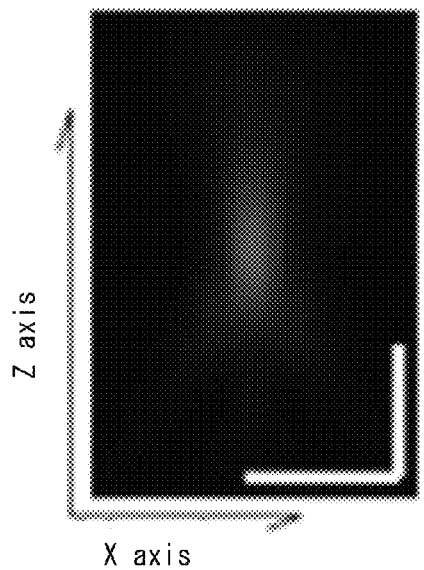
Figure 15D:
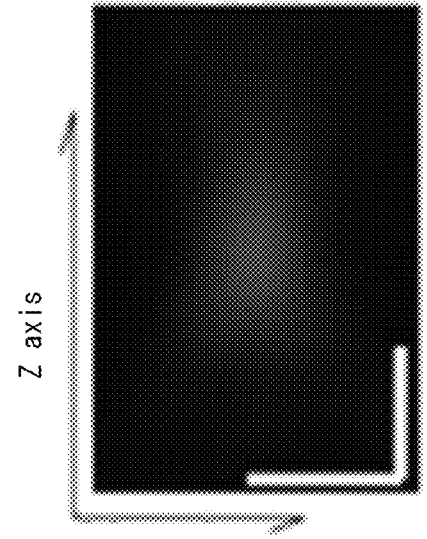

FIG. 15A shows a point spread distribution on the X-Z plane. FIGS. 15B-15D show point spread distributions after the digital image processing. FIG. 15B shows a result of Gaussian filtering with a standard deviation of two pixels. FIG. 15C shows the case where the intensity of the point spread distribution obtained by Gaussian filtering with a standard deviation of two pixels is reduced to one half. FIG. 15D shows a result of Gaussian filtering with a standard deviation of five pixels.

Figure 16A:
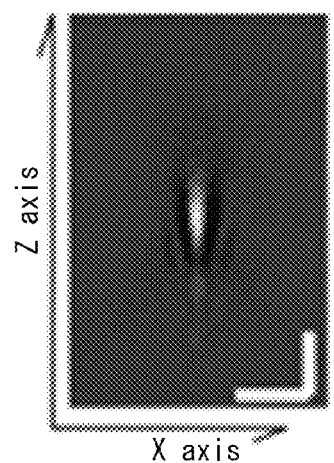
FIG. 16A is a graph representation showing difference between the point spread distributions shown in FIG. 15A and FIG. 15B.
Figure 16B:
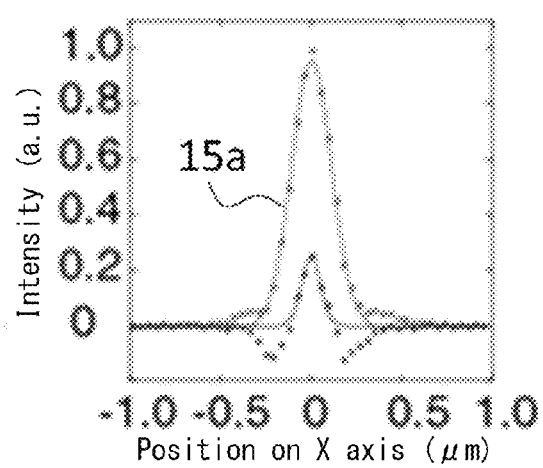
FIGS. 16B and 16C are graph representations showing its point spread distributions in the X direction and the Z direction, respectively, in FIG. 16A.
Figure 16C:
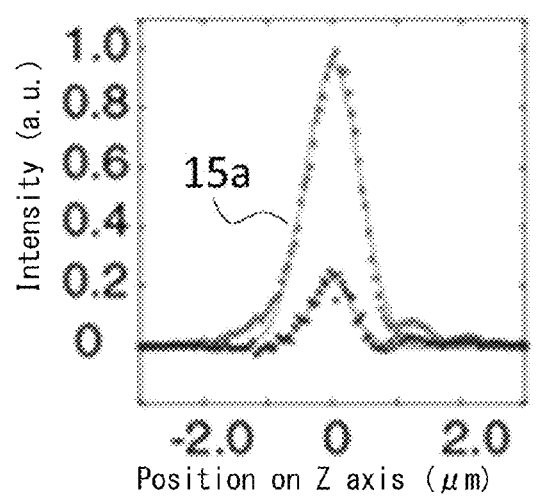

FIG. 16A shows the difference between the point spread distribution shown in FIG. 15A and the point spread distribution shown in FIG. 15B. FIGS. 16B and 16C show the point spread distributions respectively in the X direction and the Z direction in FIG. 16A. The horizontal resolution is 104 nm. The optical axial resolution is 613 nm. It is noted that a point spread distribution on which no digital image processing is performed is indicated at 15a in FIGS. 16B and 16C for comparison. Digital image processing with a comparatively small standard deviation can increase both the horizontal resolution and the optical axial resolution.

Figure 17A:
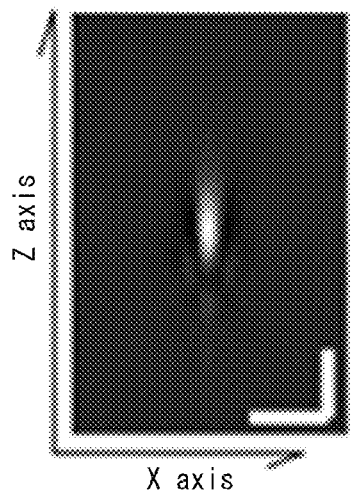
FIG. 17A is a graph representation showing difference between the point spread distributions shown in FIG. 15A and FIG. 15D.
Figure 17B:
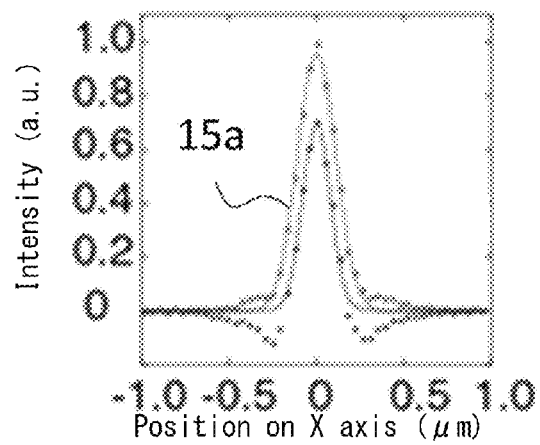
FIGS. 17B and 17C are graph representations showing its point spread distributions in the X direction and the Z direction, respectively, in FIG. 17A.
Figure 17C:
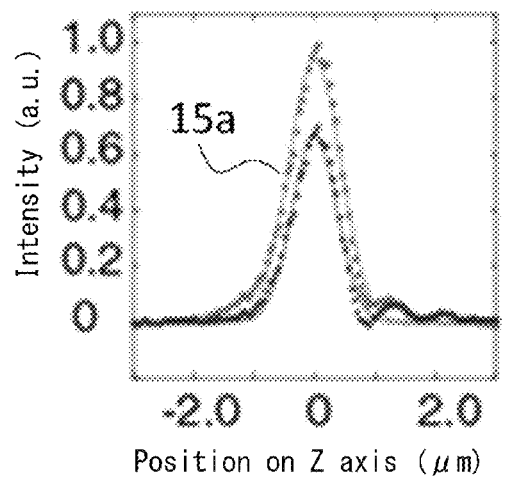

FIG. 17A shows the difference between the point spread distribution shown in FIG. 15A and the point spread distribution shown in FIG. 15D. FIGS. 17B and 17C show the point spread distributions respectively in the X direction and the Z direction in FIG. 17A. The horizontal resolution is 157 nm. The optical axial resolution is 809 nm. For comparison, a point spread distribution on which no digital image processing is performed is indicated at 15a also in FIGS. 17B and 17C. The digital image processing with a comparatively large standard deviation can also increase both the horizontal resolution and the optical axial resolution.

Figure 18A:
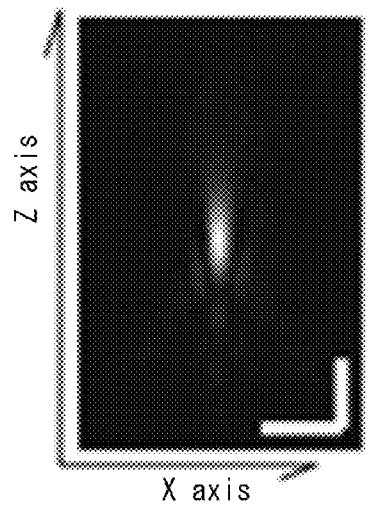
FIG. 18A is a graph representation showing difference between the point spread distributions shown in FIG. 15A and FIG. 15C.
Figure 18B:
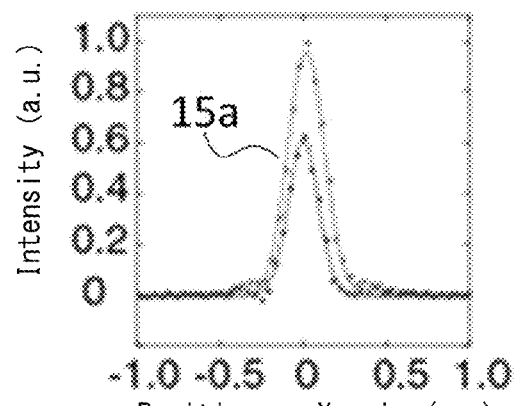
FIGS. 18B and 18C are graph representations showing its point spread distributions in the X direction and the Z direction, respectively, in FIG. 18A.
Figure 18C:
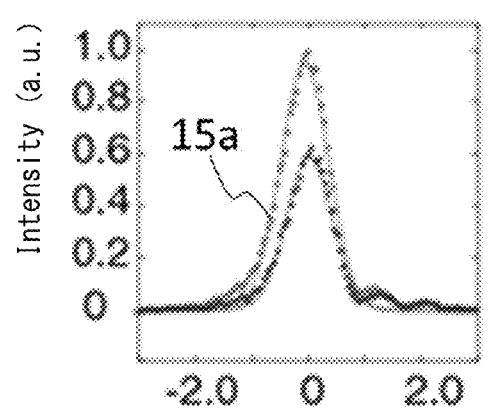

FIG. 18A shows the difference between the point spread distribution shown in FIG. 15A and the point spread distribution shown in FIG. 15C. FIGS. 18B and 18C show the point spread distributions respectively in the X direction and the Z direction in FIG. 18A. The horizontal resolution is 181 nm. The optical axial resolution is 730 nm. For comparison, a point spread distribution on which no digital image processing is performed is indicated at 15a also in FIGS. 18B and 18C. Thus, when the light intensity that is subtracted from the original point spread distribution is reduced, the foot of the point spread distribution obtained by the subtraction can be prevented from being negative.

As described above, the digital image processing can increase the resolutions of the point spread distributions. It is noted that although the difference in point spread distribution by the observation system 100 is theoretically identical with that by such digital image processing, they are not identical with each other actually. This is because the observation system 100 performs three-dimensional processing in contrast to the digital image processing in which two-dimensional processing is performed, and aberration is present in an actual optical system, so that linearity is not necessarily exhibited. As can be understood from the comparison between FIGS. 16-18 and FIGS. 12-13, the observation system 100 can further increase the resolutions (especially optical axial resolution).

Embodiment 2

Figure 19:
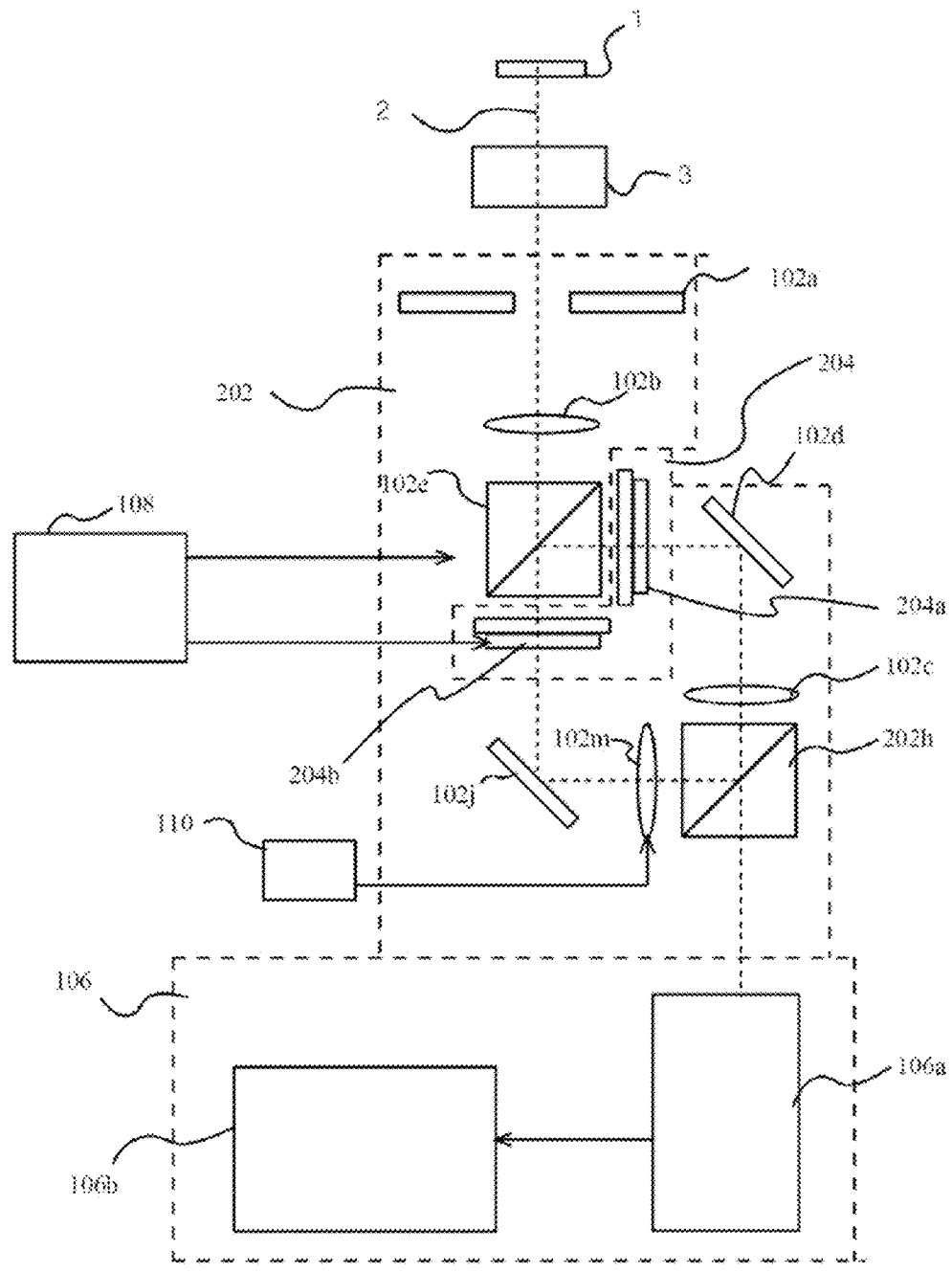
FIG. 19 is a schematic diagram showing an observation system according to Embodiment 2 of the present invention.

FIG. 19 is a schematic diagram showing an observation system 200 according to Embodiment 2 of the present invention. The observation system 200 observes a to-be-observed specimen 1 on the basis of coming light 2 coming from the to-be-observed specimen 1. The observation system 200 includes an optical system 202, a conversion unit 204 configured to convert the coming light 2 to a first converted light ray with a first pupil function and to convert the coming light to a second converted light ray with a second pupil function, an image information generation unit 106, a function changing unit 108, and a position changing unit 110. The optical system 202 is provided after an imaging plane of a fluorescence microscope 3. The optical system 202 includes a slit 102a, a first relay lens 102b, a second relay lens 102c, a first mirror 102d, a first polarizing beam splitter 102e, a fifth relay lens 102m, a mirror 102j, and a beam splitter 202h.

The respective elements other than the beam splitter 202h provided in the optical system 202 and the conversion unit 204 have the same functions as the corresponding elements included in the observation system 100 described in Embodiment 1. Therefore, description thereof is omitted.

The polarizing beam splitter 202h restores the light paths divided by the polarizing beam splitter 102e to a single light path. It is noted that the optical system 202 is not limited to the configuration shown in FIG. 19 as long as it can guide the coming light 2 to the conversion unit 204 and guide the converted light rays to the image information generation unit 106. For example, any combination and arrangement of a relay lens, a mirror, and a polarizing beam splitter may be applicable. The relay optical system composed of the two lenses 102b, 102c or 102m is employed herein as a relay system for transmitting a real image obtained by the fluorescence microscope 3 to the image information generation unit 106. However, an optical system with a single lens is employable.

The conversion unit 204 includes a third conversion section 204a configured to convert the coming light 2 with a first pupil function and a fourth conversion section 204b configured to convert the coming light 2 with a second pupil function. The third conversion section 204a and the fourth conversion section 204b are arranged at the position of the optical pupil (i.e., the position of the focal length) of the first relay lens 102b. Transmitting members are used as the third conversion section 204a and the fourth conversion section 204b in the conversion unit 204. The transmitting members herein are transmissive liquid crystal mirror arrays.

According to the observation system 200, image information on the to-be-observed specimen 1 is generated on the basis of the first converted light ray obtained by converting the coming light 2 with the first pupil function and the second converted light ray obtained by converting the coming light 2 with the second pupil function. Accordingly, a spread in the intensity distribution of the coming light 2 can be suppressed. Thus, a clear image from which blurs are eliminated can be obtained from the information on the cross-section image obtained by utilizing the coming light 2.

The observation systems 100 and 200 have been described with reference to FIGS. 1-19. Besides the reflecting members, transmitting members may be used as the members to convert the coming light 2 to the first converted light ray with the first pupil function and to convert the coming light 2 to the second converted light ray with the second pupil function. The reflecting members and the transmitting members can be ready-made easily available at low cost. Accordingly, the coming light can be converted to the first converted light ray and the second converted light ray with a low-cost configuration without requiring any special configuration as the conversion unit. Further, the conversion unit may be a digital micro-mirror device (DMD). The DMD is an element in which micro-size mirrors are laid. When the mirrors are controlled to be switched to an on state or an off state to adjust the direction of light reflection, difference in contrast between light and shade can be caused. High-speed state switching of each mirror can realize dynamic ranges according to time sharing.

It is noted that although the number of the conversion sections provided for converting the coming light to the converted light rays is two in the above description, the number of the conversion sections is not limited to two. The number of the conversion sections may be three or more. For example, in the case with three conversion sections (a first conversion section, a second conversion section, and a third conversion section), the first conversion section converts the coming light 2 to a first converted light ray with a first pupil function. The second conversion section converts the coming light 2 to a second converted light ray with a second pupil function. The third conversion section converts the coming light 2 to a third converted light ray with a third pupil function. In this case, the image information generation unit generates image information on the to-be-observed specimen on the basis of the first converted light ray, the second converted light ray, and the third converted light ray.

Alternatively, the number of the conversion sections may be one. In this case, after the conversion section converts the coming light 2 to the first converted light ray with the first pupil function, the function changing section changes the pupil function provided to the conversion section to the second pupil function. Following the change to the second pupil function by the function changing unit, the conversion section converts the coming light 2 to the second converted light ray with the second pupil function. The image information generation unit generates image information on the to-be-observed specimen on the basis of the first converted light ray and the second converted light ray.

EXAMPLE 1

The following experiment was carried out in order to check the effectiveness of the observation system 100 in observing a living body as a to-be-observed specimen. In this example, a HeLa cell line fixed to a slide glass with formalin was observed as the to-be-observed specimen. A fluorochrome (phalloidin to which Alexa Fluor® 488 is cross-linked) was added to the to-be-observed specimen. Phalloidin is bonded to actin filaments. The actin filaments inside the cell are dyed by the fluorochrome cross-linked to the phalloidin. The to-be-observed specimen was irradiated by light having a wavelength of 488 nm. Then, the fluorescent light with a wavelength equal to or larger than 510 nm coming from the to-be-observed specimen was observed. An objective lens having a numerical aperture of 1.45 and a magnification of 150× was selected as the objective lens. The magnification of the relay optical system composed of the first relay lens 102b and the second relay lens 102c was double. A first pupil function in donut shape with an outer ring having a diameter of 728 μm and an inner ring having a diameter of 104 μm was provided to the first conversion section 104a, while a second pupil function in donut shape with an outer ring having a diameter of 520 μm and an inner ring having a diameter of 104 μm was provided to the second conversion section 104b. Then, a difference image between an image $F_1$ and an image $F_2$ was obtained.

Figure 20A:
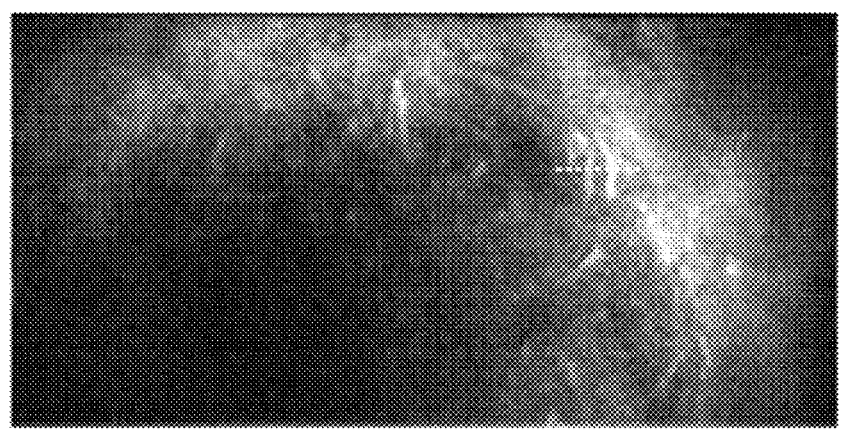
FIG. 20A shows an image observed with the observation system 100 in Example 1.
Figure 20B:
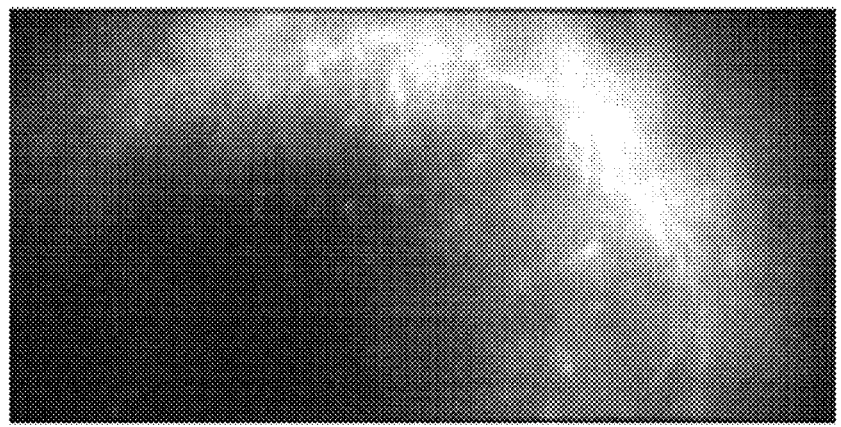
FIG. 20B shows an image observed through a conventional fluorescence microscope.

FIG. 20 shows an image observed in the present example and an image observed through a conventional fluorescence microscope. These images were obtained by observing actin filaments in a cell with the observation system 100. FIG. 20A shows a difference image between the image $F_1$ and the image $F_2$ observed in the present example. FIG. 20B shows an image observed through the conventional fluorescence microscope. The actin filaments fluorescence-labeled by Alexa Fluor® 488 can be recognized in both the images. In comparison of FIG. 20A with FIG. 20B, background light is reduced in the image of FIG. 20A, which can ensure more clear observation of the actin filaments.

Figure 21A:
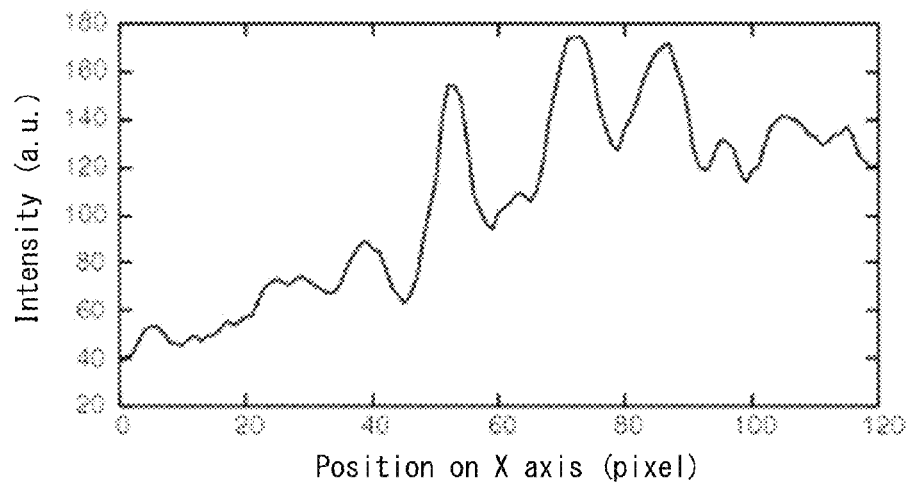
FIG. 21A is a graph representation showing a fluorescence intensity distribution of an image observed with the observation system 100.
Figure 21B:
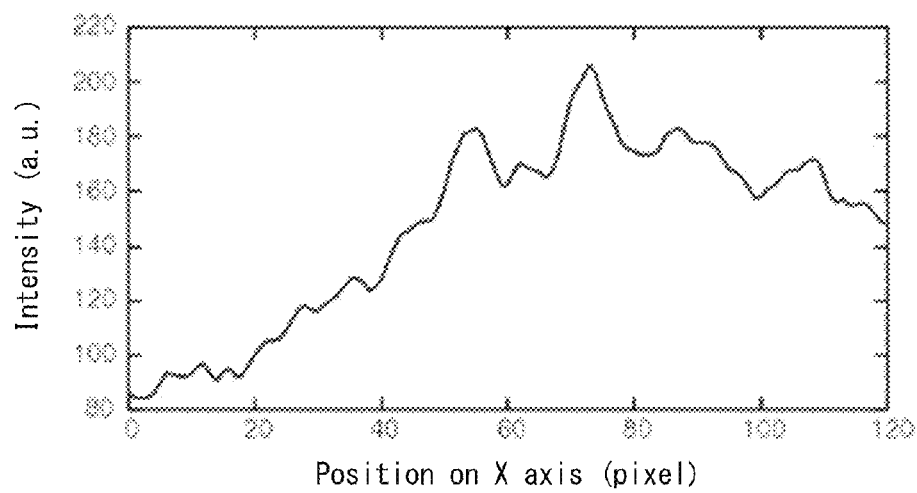
FIG. 21B is a graph representation showing a fluorescence intensity distribution of an image observed through the conventional fluorescence microscope.

FIG. 21 presents graphs indicating fluorescence intensity distributions in sections taken along the broken lines in FIG. 20. FIG. 21A shows the intensity distribution of the section obtained from the difference image (see FIG. 20A) between the image $F_1$ and the image $F_2$ observed in the present example. FIG. 21B shows the intensity distribution of the section obtained from the image (see FIG. 20B) observed through the conventional fluorescence microscope. It can be recognized that the contrast of the fluorescence micrograph according to the present example was improved.

EXAMPLE 2

Similarly to Example 1, except for the pupil functions, a HeLa cell line fixed to a slide glass with formalin was observed as a to-be-observed specimen. Here, a first pupil function in donut shape with an outer ring having a diameter of 416 μm and an inner ring having a diameter of 104 μm was provided to the first conversion section 104a, while a second pupil function in donut shape with an outer ring having a diameter of 624 μm and an inner ring having a diameter of 312 μm was provided to the second conversion section 104b. Then, a difference image between an image $F_1$ and an image $F_2$ was obtained.

Figure 22A:
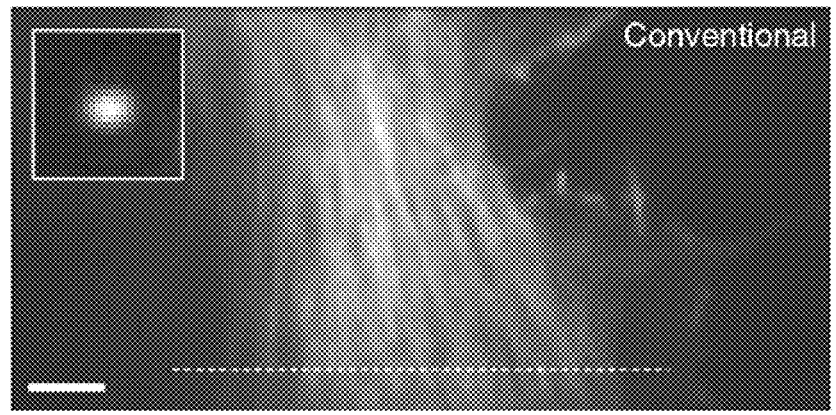
FIG. 22A shows an image observed through the conventional fluorescence microscope.
Figure 22B:
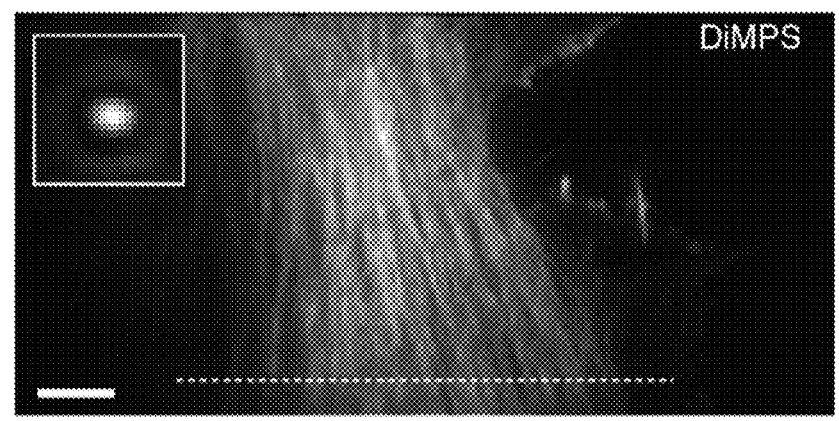
FIG. 22B shows an image observed with an observation system 100 in Embodiment 2.

FIG. 22 shows an image observed in the present example and an image observed through a conventional fluorescence microscope. These images were obtained by observing actin filaments in a cell with the observation system 100. FIG. 22A shows an image observed through the conventional fluorescence microscope. FIG. 22B shows a difference image between the image $F_1$ and the image $F_2$ observed in the present example. The actin filaments fluorescence-labeled by Alexa Fluor® 488 are recognized in both the images. In comparison of FIG. 22A with FIG. 22B, background light is reduced in the image of FIG. 22B, which can ensure more clear observation of the actin filaments.

Figure 23:
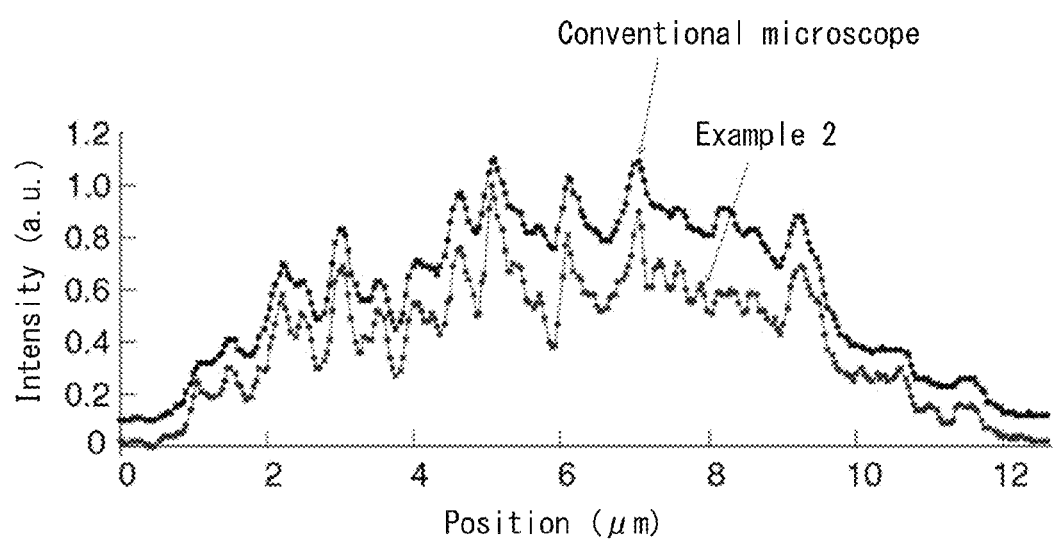
FIG. 23 is a graph representation showing fluorescence intensity distributions in sections taken along the dotted lines in FIGS. 22A and 22B.

FIG. 23 shows fluorescence intensity distributions in sections taken along the broken lines in FIGS. 22A and 22B. It can be recognized that the contrast of the fluorescence micrograph according to the present example was improved.

EXAMPLE 3

Comparison was carried out among an image observed through the conventional fluorescence microscope, an image obtained by digital image processing, and an image observed with the observation system 100. The to-be-observed specimen and the observation system 100 herein were the same as those in Examples 1 and 2.

Figure 24A:
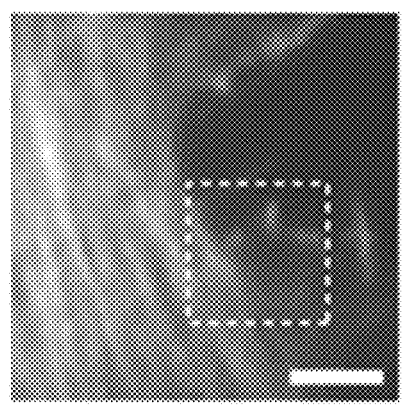
FIG. 24A shows an image obtained by digital image processing.
Figure 24B:
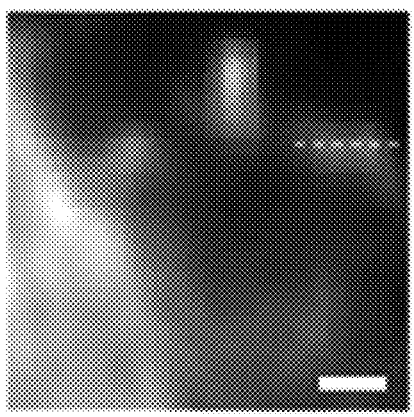
FIG. 24B shows an enlarged image of a region encircled by the broken line in FIG. 24A.
Figure 24C:
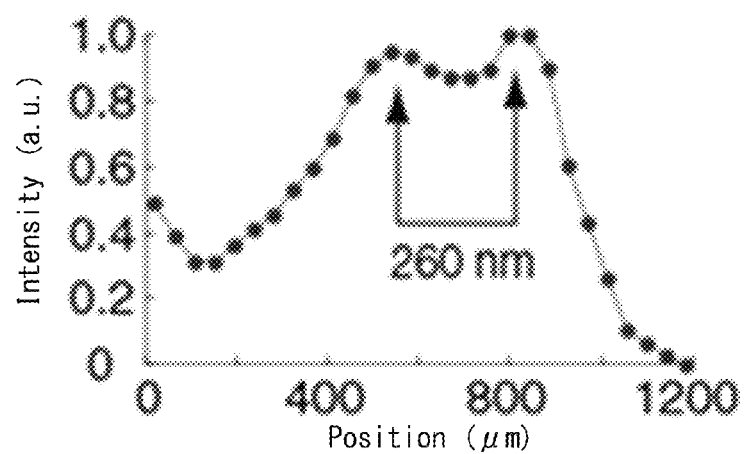
FIG. 24C is a graph representation showing a fluorescence intensity distribution in a section taken along the broken line in FIG. 24B.

FIG. 24A shows the image observed through the conventional fluorescence microscope. FIG. 24B shows an enlarged image of the region encircled by the broken line in FIG. 24A. FIG. 24C shows a fluorescence intensity distribution at a part indicated by the broken line in FIG. 24B.

Figure 25A:
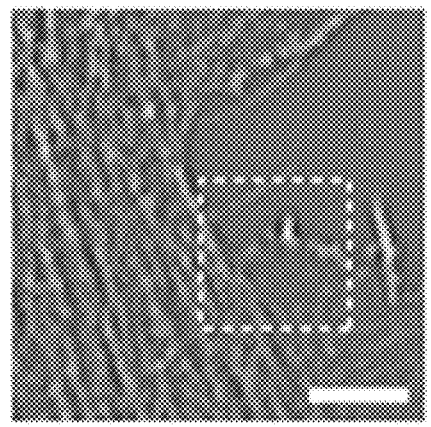
FIG. 25A shows an image obtained by digital image processing.
Figure 25B:
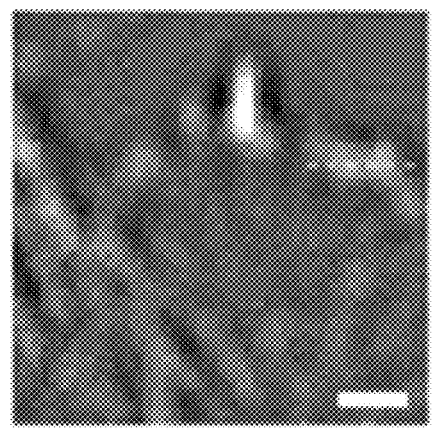
FIG. 25B shows an enlarged image of a region encircled by the broken line in FIG. 25A.
Figure 25C:
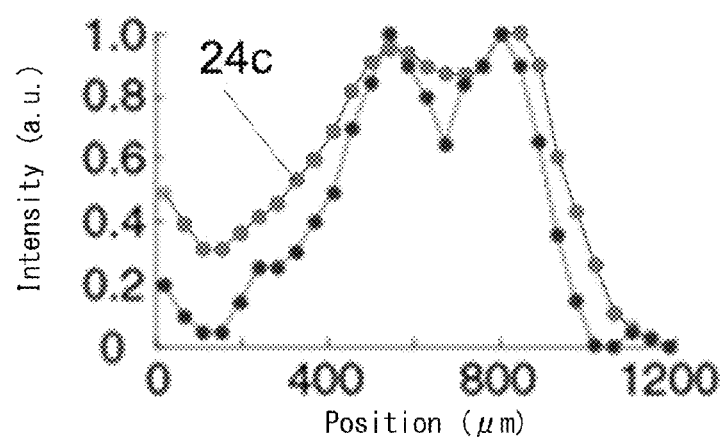
FIG. 25C is a graph representation showing a fluorescence intensity distribution in a section taken along the broken line in FIG. 25B.

FIG. 25A shows an image obtained by performing digital image processing on the image observed through the conventional fluorescence microscope. This image was obtained from the difference between the original image and an image obtained through Gaussian filtering with a standard deviation of two pixels. FIG. 25B shows an enlarged image of the region encircled by the broken line in FIG. 25A. FIG. 25C shows a fluorescence intensity distribution at a part indicated by the broken line in FIG. 25B. The fluorescence intensity distribution shown in FIG. 24C is indicated at 24c in addition in FIG. 25C. The Gaussian filtering increased the contrast ratio.

Figure 26A:
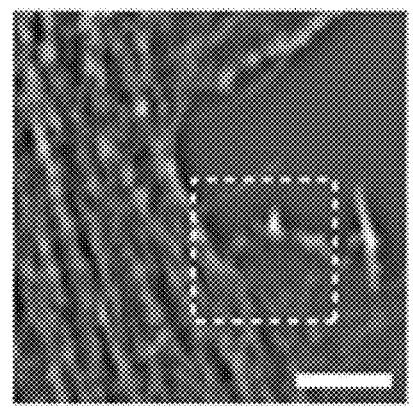
FIG. 26A shows an image obtained by digital image processing.
Figure 26B:
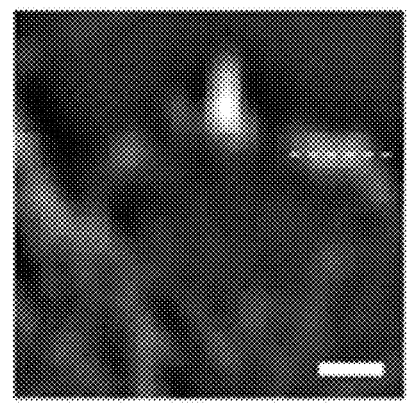
FIG. 26B shows an enlarged image of a region encircled by the broken line in FIG. 26A.
Figure 26C:
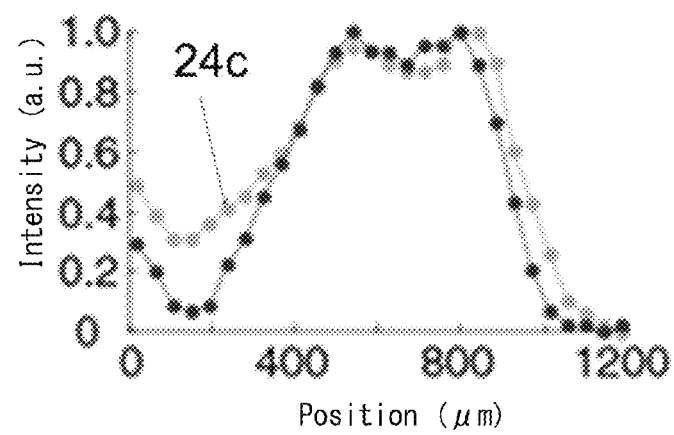
FIG. 26C is a graph representation showing a fluorescence intensity distribution in a section taken along the broken line in FIG. 26B.

FIG. 26A shows an image obtained by performing digital image processing on the image observed through the conventional fluorescence microscope. This image was obtained from the difference between the original image and an image obtained through Gaussian filtering with a standard deviation of five pixels. FIG. 26B shows an enlarged image of the region encircled by the broken line in FIG. 26A. FIG. 26C shows a fluorescence intensity distribution at a part indicated by the broken line in FIG. 26B. It is noted that the fluorescence intensity distribution shown in FIG. 24C is also indicated at 24c in addition in FIG. 26C. The Gaussian filtering increased the contrast ratio.

Figure 27A:
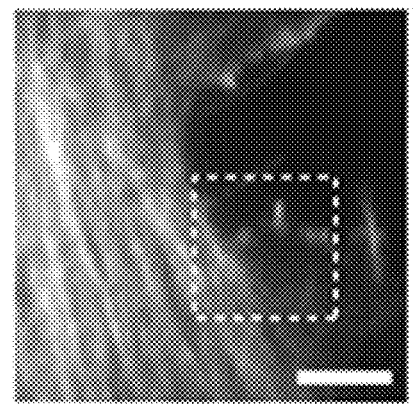
FIG. 27A shows an image observed with the observation system 100 in Example 3.
Figure 27B:
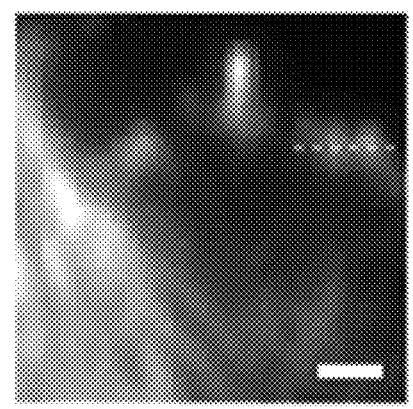
FIG. 27B shows an enlarged image of a region encircled by the broken line in FIG. 27A.
Figure 27C:
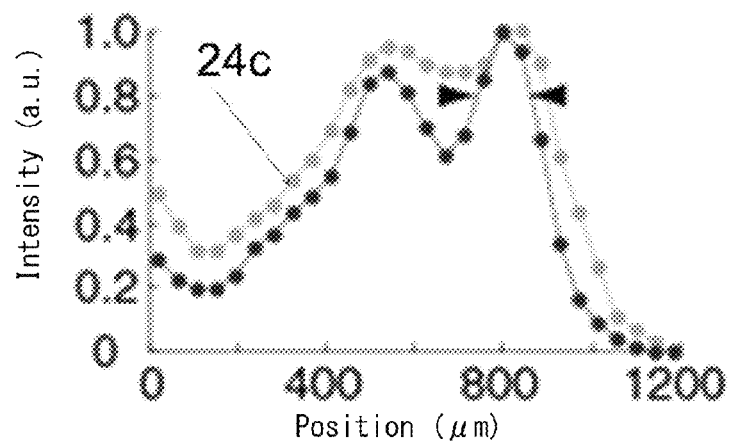
FIG. 27C is a graph representation showing a fluorescence intensity distribution in a section taken along the broken line in FIG. 27B.

FIG. 27A shows an image observed with the observation system 100. FIG. 27B shows an enlarged image of the region encircled by the broken line in FIG. 27A. FIG. 27C shows a fluorescence intensity distribution at a part indicated by the broken line in FIG. 27B. The fluorescence intensity distribution shown in FIG. 24C is also indicated at 24c in addition in FIG. 27C. The observation system 100 increased the contrast ratio. It is noted that as understood from the comparison among FIG. 27C, FIG. 25C, and FIG. 26C, the observation system 100 could further improve the contrast ratio when compared with the digital image processing.

EXAMPLE 4

Dissociation of cadherin dyed with quantum dots on a cell membrane was observed with the observation system 100. FIG. 28A shows an image of the cadherin observed with the observation system 100 at a given time. Images after 20 ms, 40 ms, 60 ms, 80 ms, 120 ms, and 240 ms with reference to the image in FIG. 28A for reference are shown in FIG. 28B, FIG.

28C, FIG. 28D, FIG. 28E, FIG. 28F, and FIG. 28G, respectively. As shown in FIGS. 28A-28F, dissociation of cadherin was observed.

Figure 29:
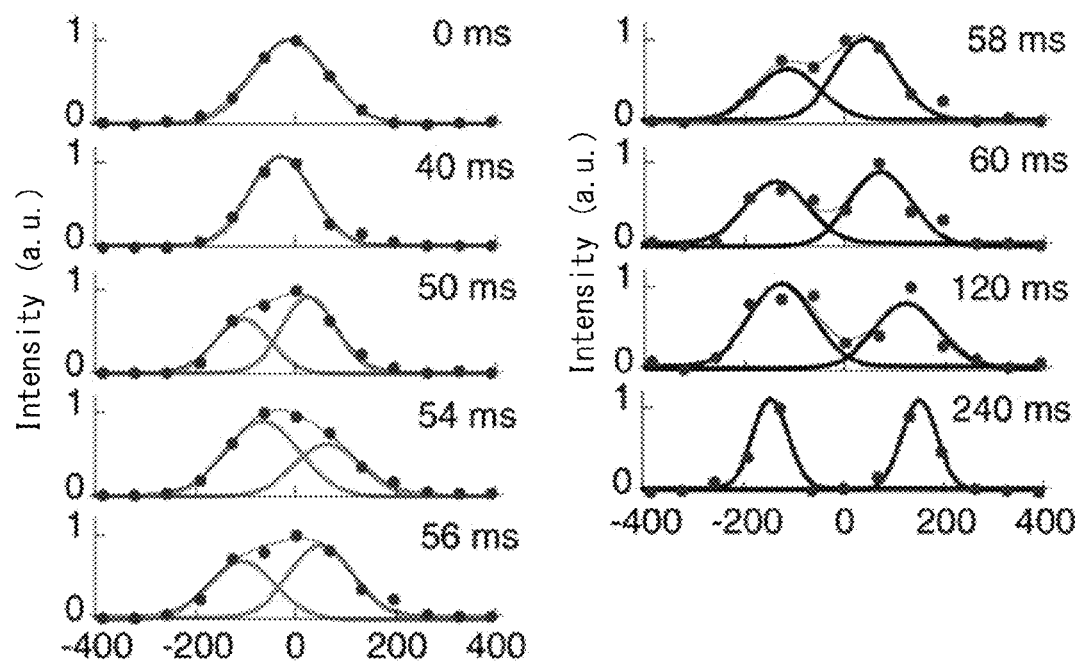
FIG. 29 presents graphs showing time variation in fluorescence intensity distribution from cadherin observed with the observation system 100 in Example 4.

FIG. 29 shows time variation in light intensity distribution at a part indicated by the broken line in FIG. 28A. In FIG. 29, the graph representations labeled at 0 ms, 40 ms, 50 ms, 54 ms, 56 ms, 58 ms, 60 ms, 120 ms, and 240 ms show the fluorescence intensity distributions with reference to 0 ms as a reference time. From the time variation in the fluorescence intensity distribution, dissociation of cadherin could be grasped also.

INDUSTRIAL APPLICABILITY

The observation system and the observation method according to the present invention are widely applicable in the field of image generation using an optical microscope. Further, incorporation of the observation system or the observation method according to the present invention into an optical microscope can increase the added value of the optical microscope itself, which can result in wide applicability in the field of optical microscopes.

REFERENCE SIGNS LIST 1 to-be-observed specimen
2 coming light
100 observation system
104 conversion unit
104a first conversion section
104b second conversion section
106 image information generation unit
108 pupil function changing unit
110 focal position changing unit
200 observation system
204 conversion unit
204a third conversion section
204b fourth conversion section

The invention claimed is:

1. An observation system for observing a to-be-observed specimen on the basis of coming light coming from the to-be-observed specimen, comprising:
    a first conversion unit configured to convert the coming light to a first converted light ray with a first pupil function;
    a second conversion unit configured to convert the coming light to a second converted light ray with a second pupil function different from the first pupil function; and
an image information generation unit configured to generate image information on the to-be-observed specimen on the basis of the first converted light ray and the second converted light ray,
    wherein each of the first pupil function and the second pupil function is a function in two-dimensional donut shape with an inner ring and an outer ring,
    the first conversion section and the second conversion section allow regions inside the respective inner rings to function as shielded regions and allow regions surrounded by the respective inner rings and the respective outer rings to function as non-shielded regions of the first pupil function and the second pupil function, respectively, and
    the first pupil function and second pupil function change at least one of a phase, a transmittance, and a reflectivity of the respective regions surrounded by the respective inner rings and the respective outer rings.

2. The observation system of claim 1, further comprising:
a pupil function changing unit configured to change at least one of the first pupil function and the second pupil function.

3. The observation system of claim 1, wherein
the first conversion unit and the second conversion unit each includes at least one of reflective liquid crystal mirror arrays, transmissive liquid crystal mirror arrays, and a digital micromirror device.

4. The observation system of claim 1, further comprising:
a focal position changing unit configured to change a focal position of the coming light.

5. The observation system of claim 1, wherein
in each of the first and second pupil functions, a value of a ratio between a diameter of the inner ring and a diameter of the outer ring is ⅙ to ⅘.

6. The observation system of claim 1, further comprising:
an optical system configured to guide the coming light to the first conversion unit and the second conversion unit.

7. The observation system of claim 1, further comprising:
an optical system configured to guide the first converted light ray and the second converted light ray to the image information generation unit.

8. A method for observing a to-be-observed specimen on the basis of coming light coming from the to-be-observed specimen, comprising:
    a first converting step of converting the coming light to a first converted light ray with a first pupil function;
    a second converting step of converting the coming light to a second converted light ray with a second pupil function different from the first pupil function; and
    an image information generating step of generating image information on the to-be-observed specimen on the basis of the first converted light ray and the second converted light ray,
    wherein each of the first pupil function and the second pupil function is a function in two-dimensional donut shape with an inner ring and an outer ring,
    in each of the first and second converting steps, regions inside the respective inner rings are allowed to function as shielded regions and regions surrounded by the respective inner rings and the respective outer rings are allowed to function as non-shielded regions of the first pupil function and the second pupil function, respectively, and
    the first and second pupil functions change at least one of respective phases, transmittances, and reflectivities of regions surrounded by the respective inner rings and the respective outer rings.

9. The method of claim 8, further comprising:
a pupil function changing step of changing at least one of the first pupil function and the second pupil function.

10. The method of claim 8, wherein the converting step includes:
    a first converting step of converting the coming light with the first pupil function; and
    a second converting step of converting the coming light with the second pupil function.

11. The method of claim 8, further comprising:
a focal position changing step of changing a focal position of the coming light.

* * * * *